United States Patent
Min et al.

(10) Patent No.: US 11,212,774 B2
(45) Date of Patent: Dec. 28, 2021

(54) V2X COMMUNICATION METHOD AND TERMINAL

(71) Applicant: Samsung Electronics Co., Ltd., Suwon-si (KR)

(72) Inventors: Byoungyoon Min, Suwon-si (KR); Hyunjeong Kang, Seoul (KR); Youngjoong Mok, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 16/636,790

(22) PCT Filed: Aug. 10, 2018

(86) PCT No.: PCT/KR2018/009148
§ 371 (c)(1),
(2) Date: Feb. 5, 2020

(87) PCT Pub. No.: WO2019/031900
PCT Pub. Date: Feb. 14, 2019

(65) Prior Publication Data
US 2020/0383088 A1     Dec. 3, 2020

(30) Foreign Application Priority Data

Aug. 10, 2017 (KR) .................. 10-2017-0101947
Aug. 18, 2017 (KR) .................. 10-2017-0105071
(Continued)

(51) Int. Cl.
*H04W 72/02*     (2009.01)
*H04W 4/40*     (2018.01)
(Continued)

(52) U.S. Cl.
CPC ............ *H04W 72/02* (2013.01); *H04W 4/40* (2018.02); *H04W 72/0406* (2013.01);
(Continued)

(58) Field of Classification Search
CPC ..... H04W 4/40–48; H04W 4/70; H04W 8/20; H04W 36/0072; H04W 72/02;
(Continued)

(56) References Cited

U.S. PATENT DOCUMENTS 10,383,117 B2 *   8/2019   Yoon ................. H04W 56/0005
10,536,826 B2 *   1/2020   Lee .................... H04W 72/087
(Continued)

FOREIGN PATENT DOCUMENTS

WO     2017/078237 A1     5/2017

OTHER PUBLICATIONS

Extended European Search Report dated May 25, 2020, issued in a counterpart European Application No. 18843989.7- 1215/3651519.
(Continued)

*Primary Examiner* — Thomas R Cairns
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

The present invention relates to a method for preventing resource selection collision between terminals and succeeding in more quickly transmitting data, on the basis of a
(Continued)

resource pool sharing plan, in order to support low latency data transmission of a V2X terminal in a wireless communication system.

7 Claims, 25 Drawing Sheets

(30) Foreign Application Priority Data

Nov. 15, 2017 (KR) ........................ 10-2017-0152585
May 10, 2018 (KR) ........................ 10-2018-0053856

(51) Int. Cl.
*H04W 72/04* (2009.01)
*H04W 92/18* (2009.01)

(52) U.S. Cl.
CPC ... *H04W 72/0446* (2013.01); *H04W 72/0453* (2013.01); *H04W 72/0493* (2013.01); *H04W 92/18* (2013.01)

(58) Field of Classification Search
CPC ........... H04W 72/0406; H04W 72/0413–0426; H04W 72/042; H04W 72/0446; H04W 72/0453; H04W 72/0493; H04W 72/087; H04W 72/10; H04W 92/18
See application file for complete search history.

(56) References Cited

U.S. PATENT DOCUMENTS

| | | | | |
|---|---|---|---|---|
| 10,624,076 | B2 * | 4/2020 | Kim | H04W 72/0406 |
| 10,694,347 | B2 * | 6/2020 | Lee | H04W 4/40 |
| 10,757,709 | B2 * | 8/2020 | Uchiyama | H04W 72/02 |
| 10,856,335 | B2 * | 12/2020 | Uchiyama | H04W 72/04 |
| 10,863,553 | B2 * | 12/2020 | Lee | H04W 74/085 |
| 10,993,263 | B2 * | 4/2021 | Lee | H04W 28/0289 |
| 2016/0066337 | A1 | 3/2016 | Sartori et al. | |
| 2017/0019887 | A1 | 1/2017 | Jiang et al. | |
| 2019/0190643 | A1 * | 6/2019 | Lee | H04L 1/0008 |
| 2019/0394786 | A1 * | 12/2019 | Parron | H04L 27/0006 |
| 2020/0107297 | A1 * | 4/2020 | Wang | H04W 72/082 |
| 2020/0296690 | A1 * | 9/2020 | Lee | H04W 4/40 |
| 2020/0296691 | A1 * | 9/2020 | Lee | H04W 52/383 |

OTHER PUBLICATIONS

LG Electronics: "Discussion on resource pool sharing between UEs using mode 3 and 4", 3GPP Draft R1-1707561,3rd Generation Partnership Project (3GPP), vol. RAN WG1, No. XP051272769 May 14, 2017, Hangzhou, China.
Ericsson: "Radio resource pool sharing between mode 3 and mode 4 UEs", 3GPP Draft; R1-1708942 Resource Pool Sharing Between Mode 3 and Mode 4—Ericsson, 3rd Generation Partnership Project (3GPP), vol. RAN WG1, No. XP051274116; May 14, 2017, Hangzhou, China.
NTT Docomo NEC: "WF D4 on resource pool sharing for mode 3 and mode 4", 3GPP Draft; R1 -1709544 WF on Mode 3 MODE 4, 3rd Generation Partnership Project (3GPP), vol. RAN WG1, vol. XP051285404 May 19, 2017, Hangzhou.
Ericsson: "Support for smaller resource reservation periods in V2X", 3GPP Draft; R1-1703034—Support for Smaller Resource Reservation Periods for V2X, 3rd Generation Partnership Project (3GPP); vol. RAN WG1, No. XP051220190; Feb. 3, Athens,Greece.
CATT, Discussion on resource pool sharing between mode 3 and mode 4, 3GPP TSG RAN WG1 Meeting #89, R1-1707450, May 6, 2017, Hangzhou, China, See sections 1-2.2.
NTT Docomo, Inc., Resource pool sharing between UEs using mode 3 and UEs using mode 4, 3GPP TSG RAN WG1 Meeting #89, R1-1708427, May 5, 2017, Hangzhou, China, See section 2.
Intel Corporation, Sharing Resource Pool for eNB-controlled and UE-autonomous V2V Transmissions Modes, 3GPP TSG RAN1 WG Meeting #88bis, R1-1704686, Mar. 25, 2017, Spokane, USA, See sections 2-3.

* cited by examiner resource for mode 3 UE resource for mode 4 UE

R/F2/E/LCID sub-header

V2X COMMUNICATION METHOD AND TERMINAL

TECHNICAL FIELD

The disclosure proposes methods for avoiding resource selection collision and facilitating successful transmission of a vehicular communication (connected car or vehicle to everything (V2X)) terminal in order to support low latency data transmission in a wireless communication system. The resource selection may be performed via direct communication between mode 3 and mode 4 terminals.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G systems will support more diverse services in comparison with the legacy 4G systems. Examples of representative services may include enhanced mobile broadband (eMBB) services, ultra-reliable and low latency communication (URLLC) services, massive machine type communication (mMTC) services, and evolved multimedia broadcast/multicast services (eMBMS). A system supporting the URLLC services may be called an URLLC system, and a system supporting the eMBB services may be called an eMBB system. The terms "service" and "system" may be interchangeably used.

Among these services, the URLLC service is newly considered for the 5G system, while not being considered for 4G systems, and has requirements of ultra-reliability (e.g., packet error rate of about 10-5) and low latency (e.g., about 0.5 msec). In order to meet such demanding requirements, the URLLC service may be provided with a transmission time interval shorter than that of the eMBB service in consideration of various operation schemes.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

The disclosure aims to provide a method for sharing a radio resource pool for vehicular communication in accordance with an operation mode of a terminal to support vehicular communication services and data transmissions meeting given reliability and low latency requirements.

The objects of the disclosure are not limited to the aforesaid, and other objects not described herein will be clearly understood by those skilled in the art from the descriptions below.

Solution to Problem

In order to solve the above problems, according to a disclosed embodiment, a method of a first mode terminal in a wireless communication system includes receiving a message including information on shared resources for vehicle-to-everything (V2X) communication of a first mode terminal and a second mode terminal from a base station, configuring a resource reservation field based on the information on the shared resources and a semi-persistent scheduling (SPS) periodicity configured to the first mode terminal, and transmitting a control message including the configured resource reservation field.

According to a disclosed embodiment, a method of a second mode terminal in a wireless communication system includes receiving a message including information on shared resources for vehicle-to-everything (V2X) communication of a first mode terminal and a second mode terminal from a base station and receiving a control message including a resource reservation field configured based on the information on the shared resources and a semi-persistent scheduling (SPS) periodicity configured to the first mode terminal from the first mode terminal.

According to a disclosed embodiment, a first mode terminal in a wireless communication system includes a transceiver and a controller configured to control the transceiver to receive a message including information on shared resources for vehicle-to-everything (V2X) communication of a first mode terminal and a second mode terminal from a base station, control to configure a resource reservation field based on the information on the shared resources and a semi-persistent scheduling (SPS) periodicity configured to the first mode terminal, and control the transceiver to transmit a control message including the configured resource reservation field.

According to a disclosed embodiment, a second mode terminal in a wireless communication system includes a transceiver and a controller configured to control the transceiver to receive a message including information on shared resources for vehicle-to-everything (V2X) communication of a first mode terminal and the second mode terminal from a base station and receive a control message including a resource reservation field configured based on the information on the shared resources and a semi-persistent scheduling (SPS) periodicity configured to the first mode terminal from the first mode terminal.

Advantageous Effects of Invention

The disclosed methods are advantageous in terms of improving resource management efficiency of a shared radio resource pool and meeting low latency requirements for vehicular communication by protecting against resource selection collision in a vehicular communication system.

The advantages of the disclosure are not limited to the aforesaid, and other advantages not described herein may be clearly understood by those skilled in the art from the descriptions below.

MODE FOR THE INVENTION

Figure 1A:
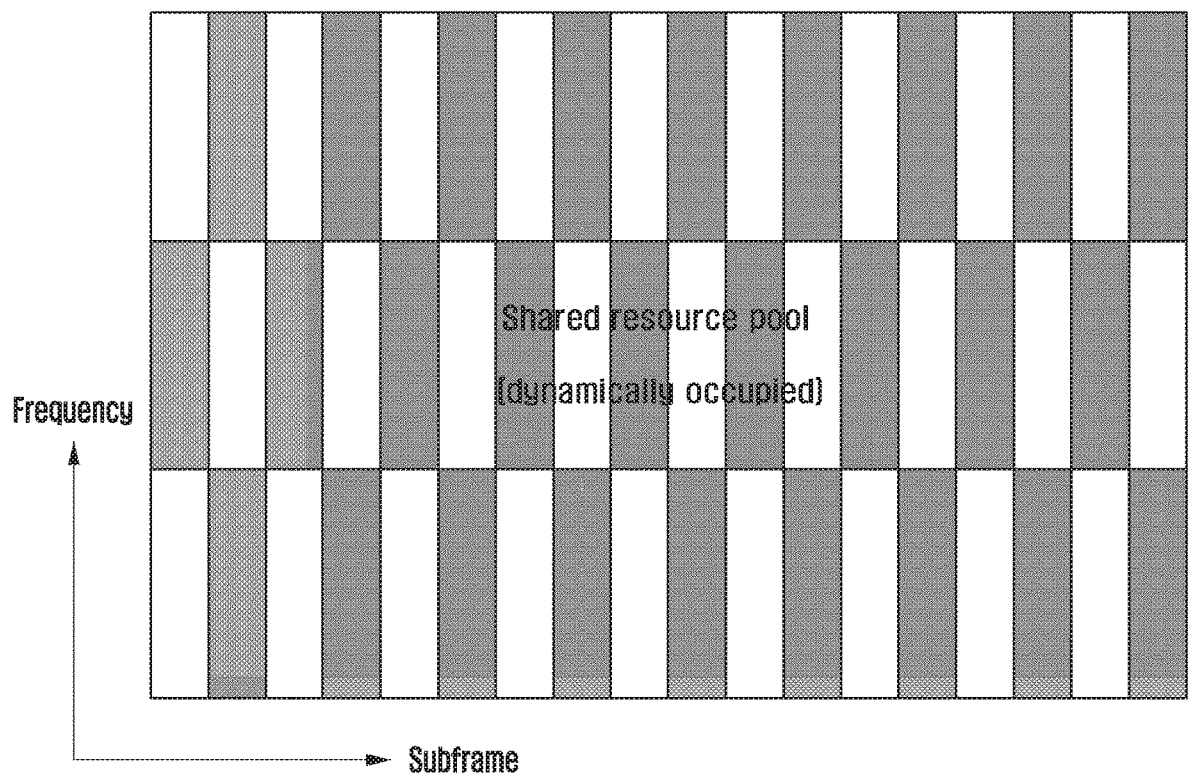
FIGS. 1A and 1B are diagrams for explaining a situation of using a shared resource pool dynamically in a V2X vehicular communication system according to a disclosed embodiment.
Figure 1A:
Figure 1A:

Exemplary embodiments of the disclosure are described in detail with reference to the accompanying drawings.

Detailed descriptions of technical specifications well-known in the art and unrelated directly to the disclosure may be omitted to avoid obscuring the subject matter of the disclosure. This aims to omit unnecessary description so as to make the subject matter of the disclosure clear.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a generalpurpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

Figure 1B:
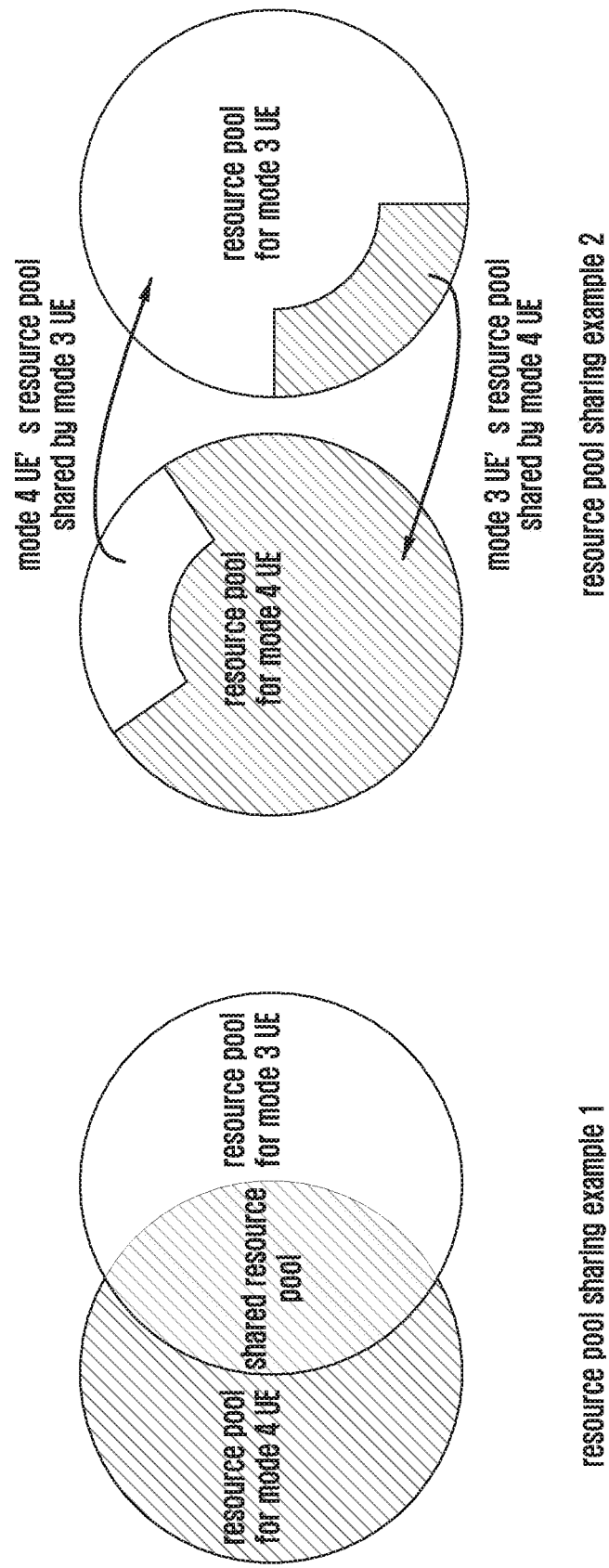

FIGS. 1A and 1B are diagrams for explaining a situation of using a shared resource pool dynamically in a V2X vehicular communication system according to a disclosed embodiment.

In a disclosed embodiment, the resources to be shared may be scheduled resources for sidelink communications or terminal-autonomously selected resources. The scheduled resources are resources that a base station schedules for V2X communication of a terminal. The terminal-autonomously selected resources may be the resources that a terminal autonomously selects in a resource pool assigned for V2X communication.

A first mode terminal may be a terminal operating in a V2X communication mode using the scheduled resources. For example, the first mode terminal may be a terminal operating in a sidelink transmission mode 3. A second mode terminal may be a terminal operating in a V2X communication mode using the terminal-autonomously selected resources. For example, the second mode terminal may be a terminal operating in a sidelink transmission mode 4.

The disclosed embodiments may be applied to a situation where terminals operating in one of two sidelink transmission modes, i.e., mode 3 (using the resources scheduled by a base station) and mode 4 (using the terminal-autonomously selected resources), use a shared resource pool dynamically as shown in FIG. 1A. In a disclosed embodiment, a shared resource pool may be a resource pool shared by a terminal operating in mode 3 and a terminal operating in mode 4 as shown in part (1) of FIG. 1B, or a resource pool allowed to be used by a terminal operating in mode 4 within a resource pool assigned to a terminal operating in mode 3 or a resource pool allowed to be used by a terminal operating in mode 3 with a resource pool assigned to a terminal operating in mode 4 as shown in part (2) of FIG. 1B. For example, in the case where a V2X terminal operating in mode 4 uses the resource pool assigned to the V2X terminal operating in mode 3, the terminal operating in mode 4 may use resources minimizing disruption to the V2X communication of the terminal operating in mode 3. In the case where a V2X terminal operating in mode 3 uses the resource pool assigned to the V2X terminal operating in mode 4, the terminal operating in mode 3 may use resources minimizing disruption to the V2X communication of the terminal operating in mode 4. Using the shared resource pool aims to improve V2X frequency resource utilization and avoid radio resource collision to meet the low latency requirements for V2X terminals operating in mode 3/4.

Figure 2:
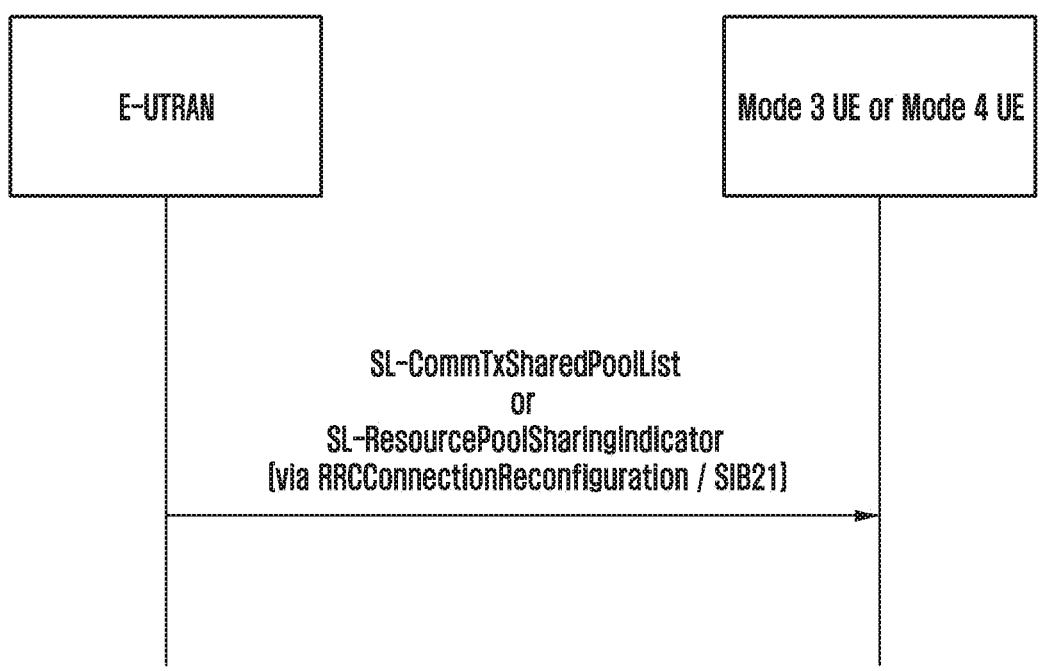
FIG. 2 is a signal flow diagram illustrating a method for a base station to manage a shared resource pool in a V2X vehicular communication system according to a disclosed embodiment.

FIG. 2 is a signal flow diagram illustrating a method for a base station to manage a shared resource pool in a V2X vehicular communication system according to a disclosed embodiment.

The disclosed embodiment of FIG. 2 is directed to a method for managing radio resource pools shared between mode 3 and mode 4 terminals for V2X communication. The base station may provide the mode 3 and mode 4 terminals with transmit resource pool information via an RRC connection reconfiguration (RRCConnectionReconfiguration) message, a system information block (SIB) 21, or another RRC message. For example, the base station may separately manage a shared resource pool list for sidelink communication and a non-shared resource pool list, which are transmitted to the mode 3 and mode 4 terminals (SL-CommTxSharedPoolList may be used in the embodiment of FIG. 2). As another example, the base station may use an on/off indication message to notify whether each of the resource pools contained in a resource pool list is shared or not (SL-ResourcePoolSharingIndicator may be used in the embodiment of FIG. 2).

Embodiment of using SL-CommTxSharedPoolList
SharedPoolList {pool1, pool2, pool3}
NonSharedPoolList {pool4, pool5, pool6}

According to a disclosed embodiment, a shared pool list (SharedPoolList) may include information on a shared pool (SharedPool) of the mode 3 and mode 4 pools as shown in part (1) of FIG. 1B. According to a disclosed embodiment, a non-shared pool list (NonSharedPool) may include information on a non-shared pool (NonSharedPool) of the mode 3 and mode 4 pools as shown in part (1) of FIG. 1B.

According to another disclosed embodiment, the SharedPoolList may include information on shared parts of the mode 3 and mode 4 resource pools as shown in part (2) of FIG. 1B. According to another disclosed embodiment, the NonSharedPoolList may include information on non-shared parts of the mode 3 and mode 4 resource pools as shown in part (2) of FIG. 1B.

Embodiment of using SL-ResourcePoolSharingIndicator
Pool1 {SL-ResourcePoolSharingIndicator=off}
Pool2 {SL-ResourcePoolSharingIndicator=off}
Pool3 {SL-ResourcePoolSharingIndicator=off}
Pool4 {SL-ResourcePoolSharingIndicator=on}
Pool5 {SL-ResourcePoolSharingIndicator=on}
Pool6 {SL-ResourcePoolSharingIndicator=on}

According to a disclosed embodiment, pool1 to pool3 may include information on the non-shared resource pool of the mode 3 and mode 4 resource pools as shown in part (1) of FIG. 1B. Pool4 to pool6 may include information on the shared resource pool of the mode 3 and mode 4 resource pools as shown in part (1) of FIG. 1B.

According to another disclosed embodiment, pool1 to pool3 may include information on the non-shared part of the mode 3 resource pool as shown in part (2) of FIG. 1B. Pool4 to pool6 may include information on the shared part of the mode 3 resource pool as shown in part (2) of FIG. 1B. Pool4 to pool6 may be used for mode 4.

According to another disclosed embodiment, pool1 to pool3 may include information on the non-shared part of the mode 4 resource pool as shown in part (2) of FIG. 1B. Pool4 to pool6 may include information on the shared part of the mode 4 resource pool as shown in part (2) of FIG. 1B.

Figure 3:
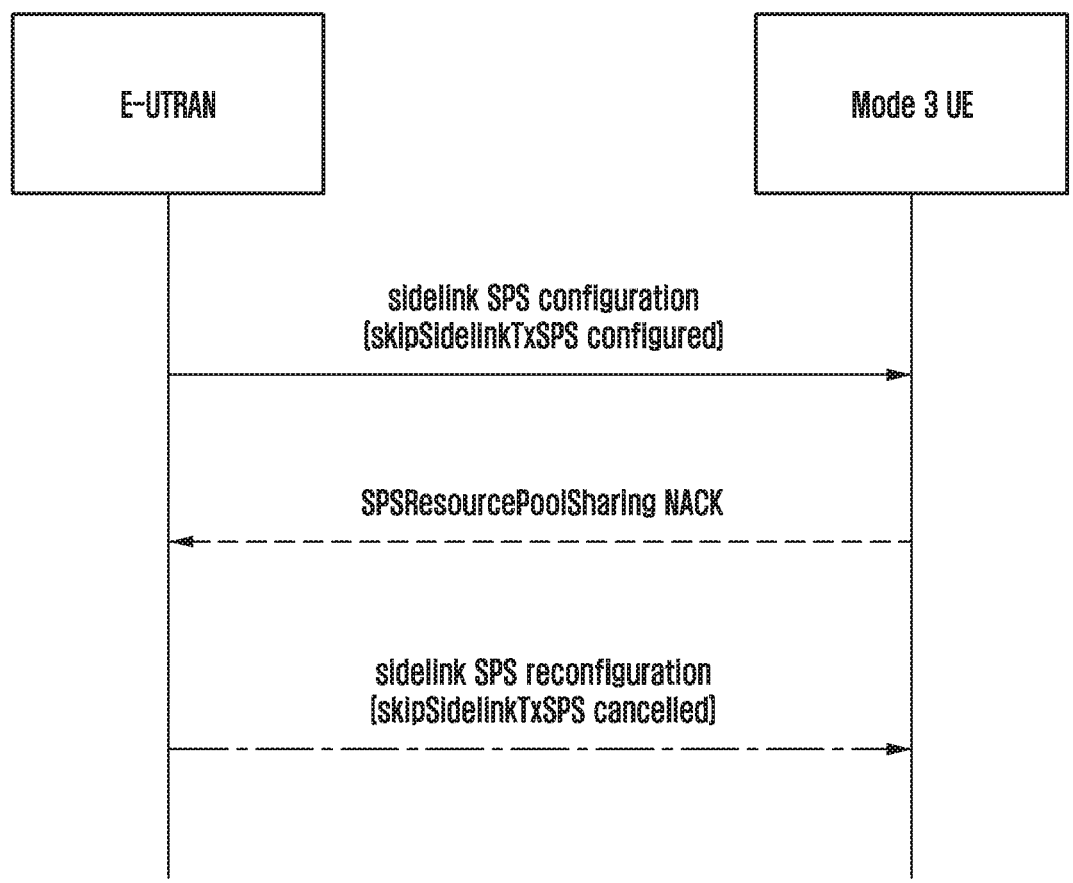
FIG. 3 is a diagram illustrating a situation where a mode 3 terminal does not want to share a resource pool when a shared resource pool is established in a V2X vehicular communication system according to a disclosed embodiment.

FIG. 3 is a diagram illustrating a situation where a mode 3 terminal does not want to share a resource pool when a shared resource pool is established in a V2X vehicular communication system according to a disclosed embodiment.

The disclosed embodiment of FIG. 3 is directed to a situation where it is not wanted for the mode 3 terminal to share idle resources occurring by skipping SPS transmission with a mode 4 terminal when a shared radio resource pool is established for V2X communication. For example, in the case where a sidelink SPS configuration indicates skipping SPS transmission of the mode 3 terminal, the mode 3 terminal may transmit an SPS resource pool sharing (SPS-ResourcePoolSharing) NACK to reject sharing the idle resources with a mode 4 terminal. As another example, in the case where the mode 3 terminal does not share the SPS idle resources with the mode 4 and receives an SPS transmission skip termination indication from the base station, it may cancel SPS transmission upon receipt of a sidelink SPS reconfiguration message from the base station. This exemplary operation may be performed only by a mode 3 terminal that is directly scheduled by the base station, which may directly control a skip-sidelink transmission SPS (skipSidelinkTxSPS) configuration.

Figure 4:
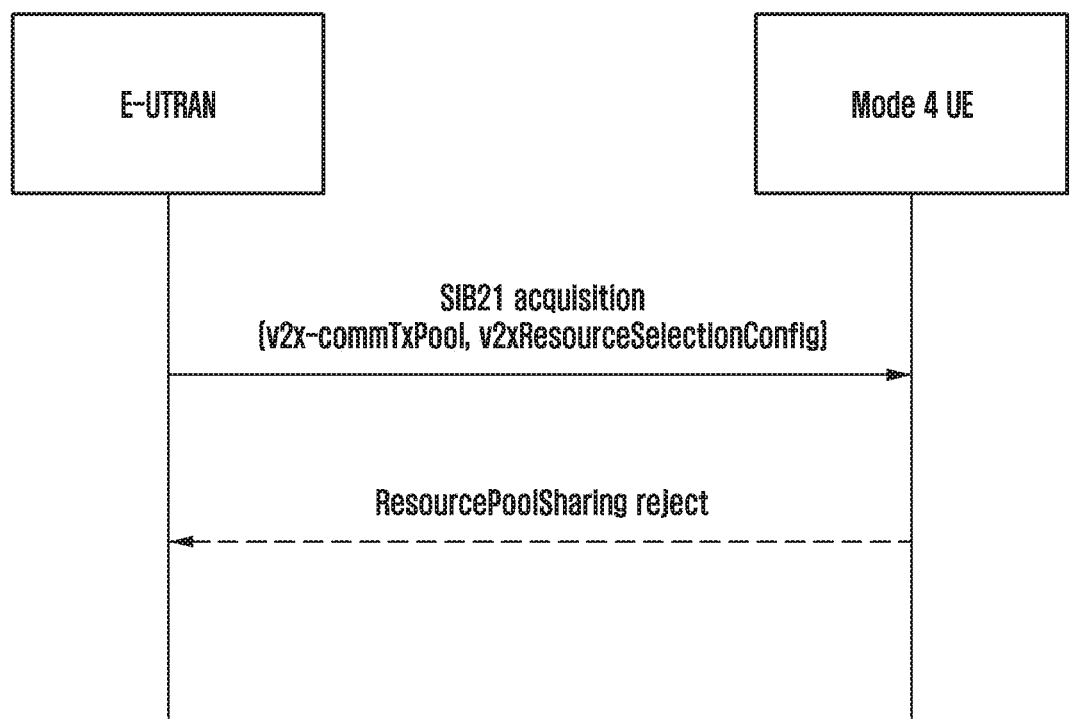
FIG. 4 is a diagram illustrating a situation where a mode 4 terminal does not want to share a resource pool when a shared resource pool is established in a V2X vehicular system according to a disclosed embodiment.

FIG. 4 is a diagram illustrating a situation where a mode 4 terminal does not want to share a resource pool with a mode 3 terminal when a shared radio resource pool is established for V2X communication according to a disclosed embodiment.

For example, in the case where a base station may notify mode 4 terminals of a resource pool via SIB 21, a representative terminal or some of the mode 4 terminals may transmit an RRC message indicating that they do not want resource pool sharing in the mode 4 resource pool. This is one of exemplary embodiments of notifying the base station of the mode 4 resource pool state where there is already a sufficient number of mode 4 terminals using the mode 4 resource pool. The resource pool sharing (ResourcePool-Sharing) reject message may include an index indicating a resource pool intended not to be shared with mode 3 terminals.

Figure 5A:
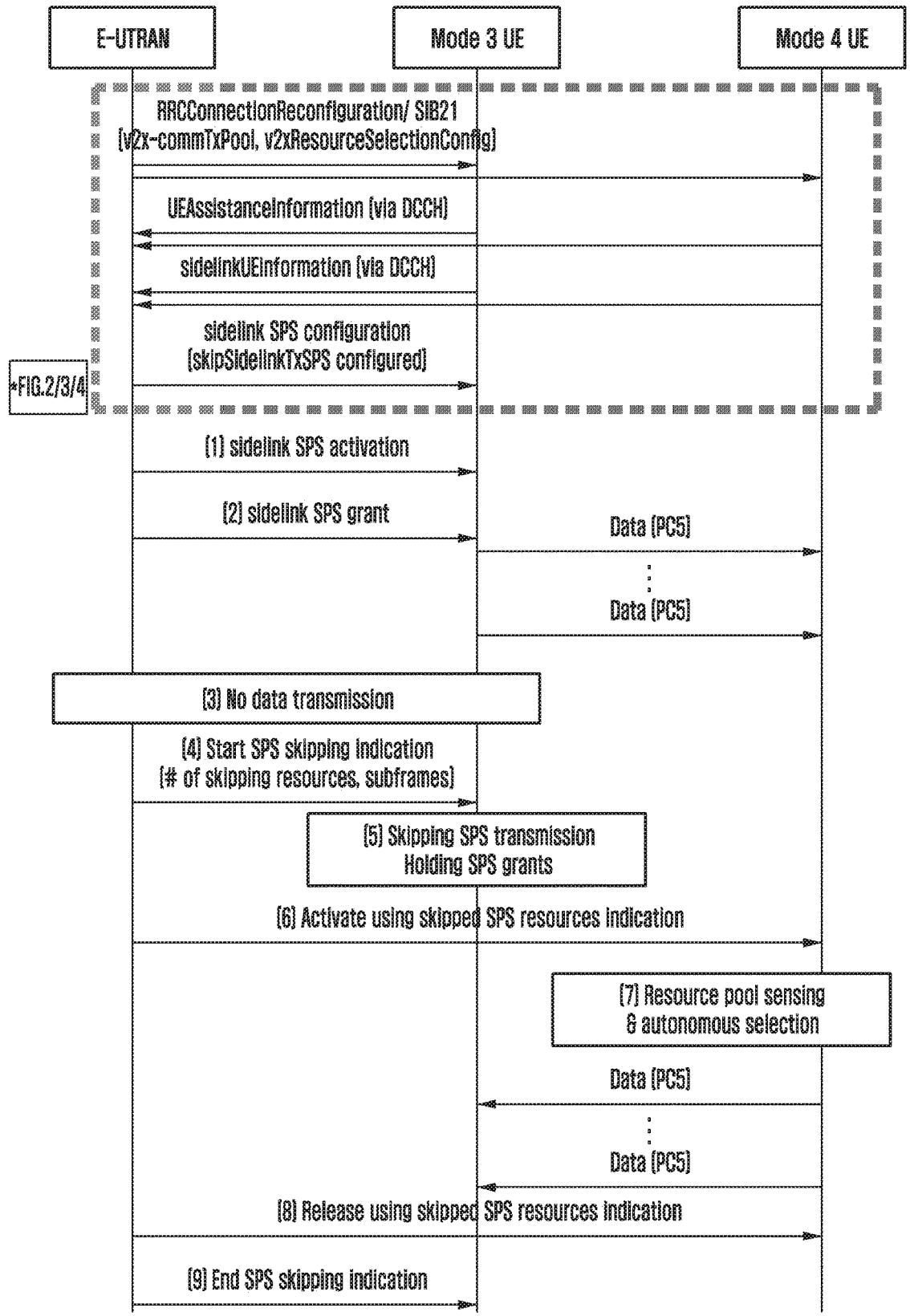
FIGS. 5A and 5B are signal flow diagrams illustrating a procedure for a base station to notify a mode 3 terminal and a mode 4 terminal of a use timing of shared radio resources when a mode 3 shared radio resource pool is established for V2X communication according to a disclosed embodiment.
Figure 5B:
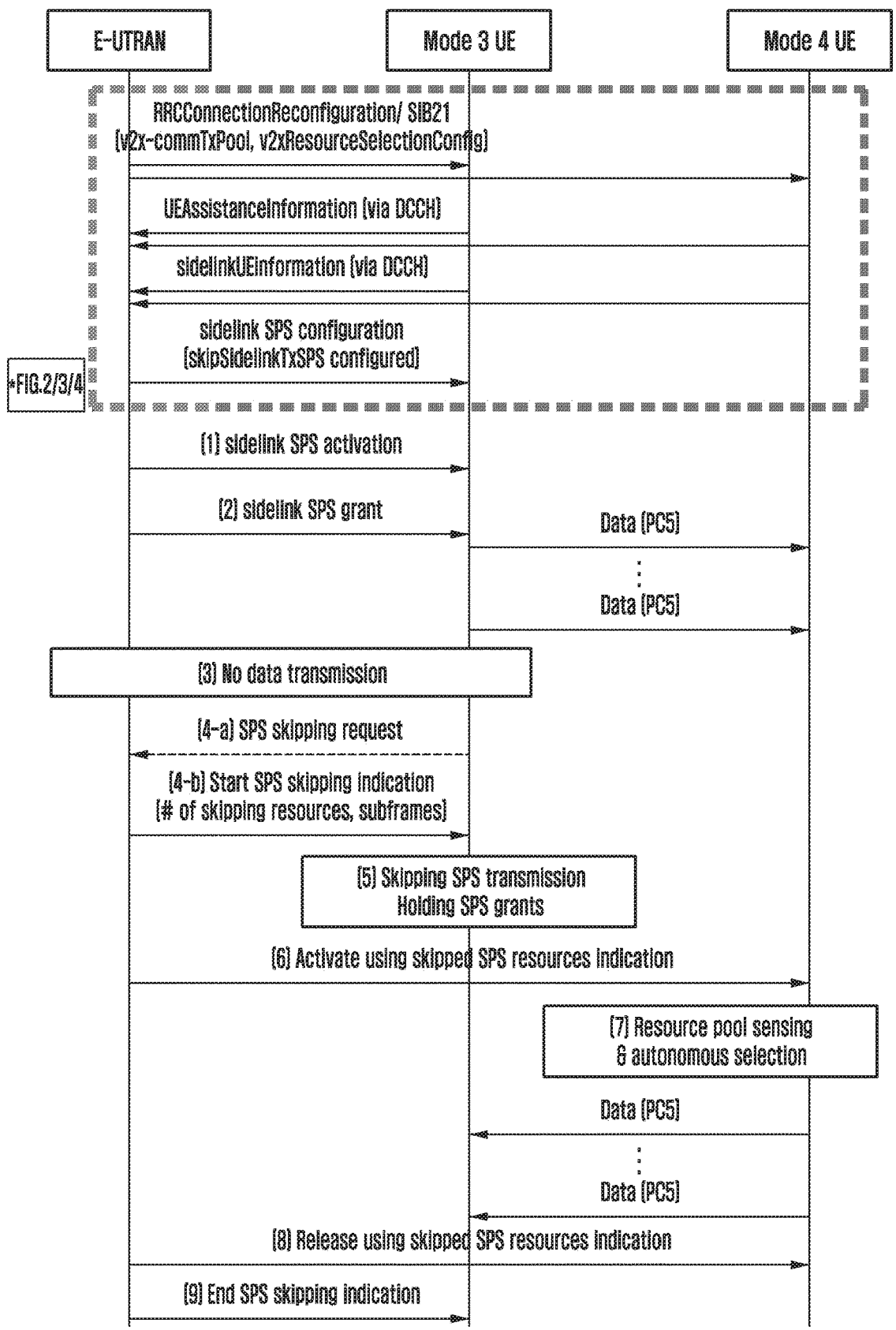

FIGS. 5A and 5B are signal flow diagrams illustrating a procedure for a base station to notify a mode 3 terminal and a mode 4 terminal of a use timing of shared radio resources when a mode 3 shared radio resource pool is established for V2X communication according to a disclosed embodiment.

FIGS. 5A and 5B show signal flows among the base station and the mode 3 and mode 4 terminals in a scenario for the base station is to notify the mode 3 and mode 4 terminals of the use timing of the shared radio resources in the mode 3 radio resource pool established for V2X communication. The shared radio resource pool is established and managed through exchange of RRC Connection Reconfiguration messages between the base station and the mode 3 and between the base station and the mode 4 terminal and on the basis of the information in SIB 21 (see FIGS. 2, 3, and 4).

At steps (1) and (2), the base station activates sidelink semi-persistent scheduling (SPS) to allocate radio resources to the mode 3 terminal in order for the mode 3 terminal to perform sidelink communication using the allocated radio resources. If, at step (3), there is no more data to transmit on the allocated SPS radio resources, i.e., if the corresponding buffer of the mode 3 terminal is empty, the base station transmits an SPS transmission skip indication at step (4) as shown in FIG. 5A.

In the embodiment of FIG. 5B, the mode 3 terminal transmits an SPS transmission skip request to the base station at step (4-*a*). The operation of step (4) of FIG. 5A in which the base station instructs skipping of SPS transmission or steps (4-*a*) and (4-*b*) of FIG. 5B in which the terminal requests skipping of SPS transmission and the base station instructs skipping of SPS transmission may be performed in such a way that the mode 3 SPS terminal notifies the base station of no data to transmit as a buffer status report (BSR) operation and the base station transmits a downlink control information (DCI) 5A type message instructing skipping of sidelink SPS. As an alternative operation of step (4-*b*) of FIG. 5B, the base station may notify the terminal of a number of subframes or resource units to skip transmission thereon along with a mode 3 SPS transmission skip indication. The operation of step (4) is applied to the mode 3 terminal to which skipSidelinkTxSPS is configured in the SPS configuration, and the terminal configured with skipSidelinkTxSPS and receiving the SPS transmission skip indication may skip SPS transmission while maintaining the SPS grant at step (5).

In order for the mode 4 terminal to use the idle SPS resources in the radio resource pool of the mode 3 terminal, the base station instructs the mode 4 terminal to use the idle SPS resources at step (6). For the operation of step (6), the base station may use an RRC Connection Reconfiguration message to the mode 4 terminal or SIB 21. Upon receipt of the instruction, the mode 4 terminal may perform an autonomous resource sensing and selection operation at step (7) to transmit sidelink data. After the SPS transmission skip operation instructed at step (4) is completed, the base station instructs the mode 4 terminal to stop using the idle SPS resources at step (8) and instructs the mode 3 terminal to end skipping SPS transmission at step (9). Afterward, the mode 3 terminal resumes data transmission on the SPS resources based on the SPS grant and, if there is no more data to transmit on the SPS resources, releases the SPS.

The detailed operation of the mode 4 terminal in the above embodiment is described hereinafter with reference to the flowcharts of FIGS. 8A to 8D.

Figure 8A:
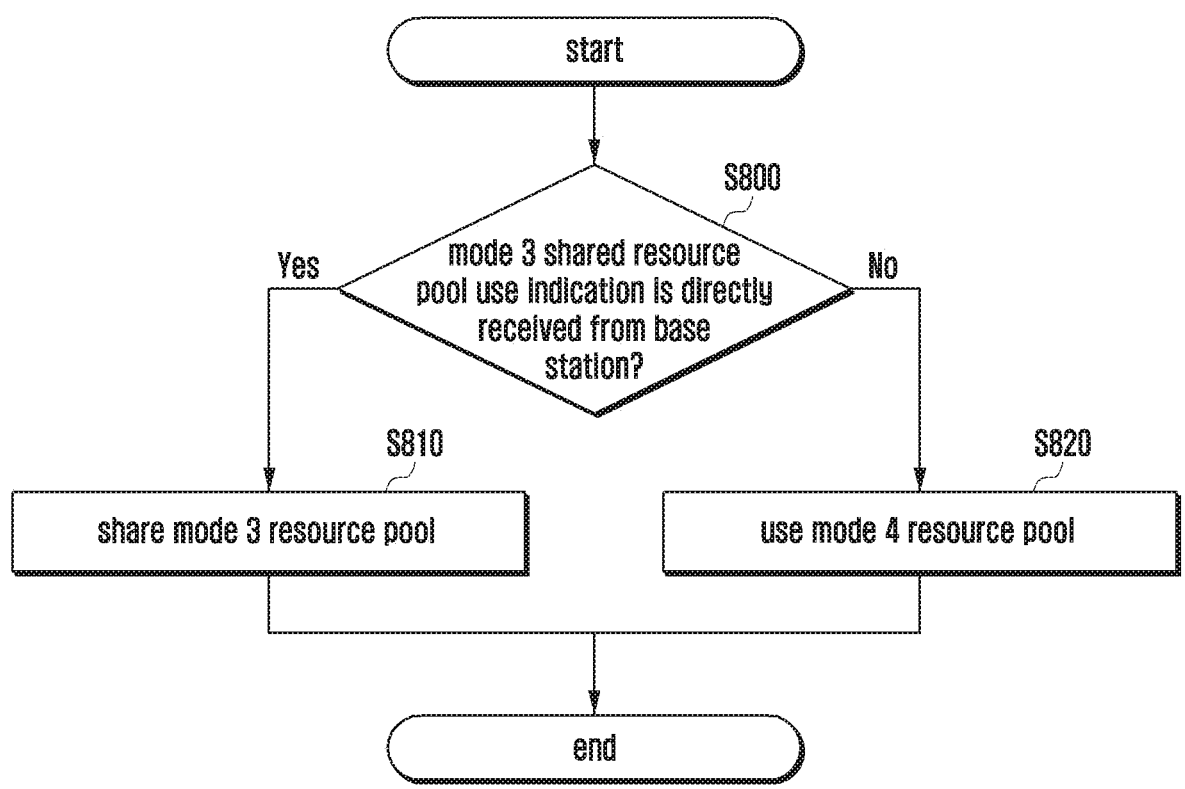
FIGS. 8A to 8D are flowcharts illustrating operations of a mode 4 terminal in the procedures of FIGS. 5A, 5B, 6A, 6B, 7A, and 7B when a mode 3 shared radio resource pool is established for V2X communication according to disclosed embodiments.

As shown in FIG. 8A, the mode 4 terminal may determine at step S800 whether a mode 3 shared resource pool use indication is received from the base station. If it is determined that the mode 3 shared resource pool use indication is received from the base station, the mode 4 terminal may use the mode 3 shared resource pool at step S810. If it is determined that no mode 3 shared resource pool use indication is received from the base station, the mode 4 terminal may use the mode 4 resource pool at step S820.

Figure 8B:
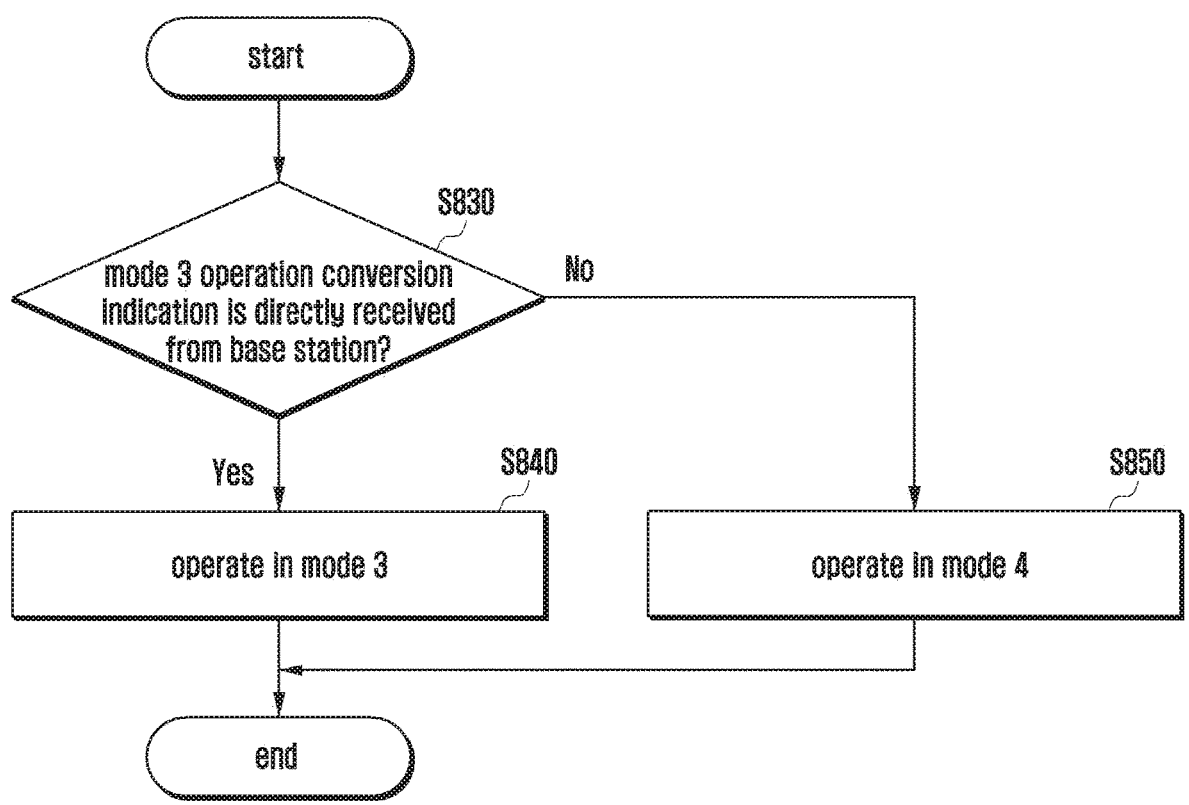

According to another disclosed embodiment, as shown in FIG. 8B, if it is determined at step S830 that a mode 3 operation conversion indication is received from the base station, the mode 4 terminal may convert to mode 3 to operate as if it is a mode 3 terminal at step S840. If it is determined at step S830 that no mode 3 operation conversion indication is received from the base station, the mode 4 terminal may operate as the mode 4 terminal at step S850.

Figure 8C:
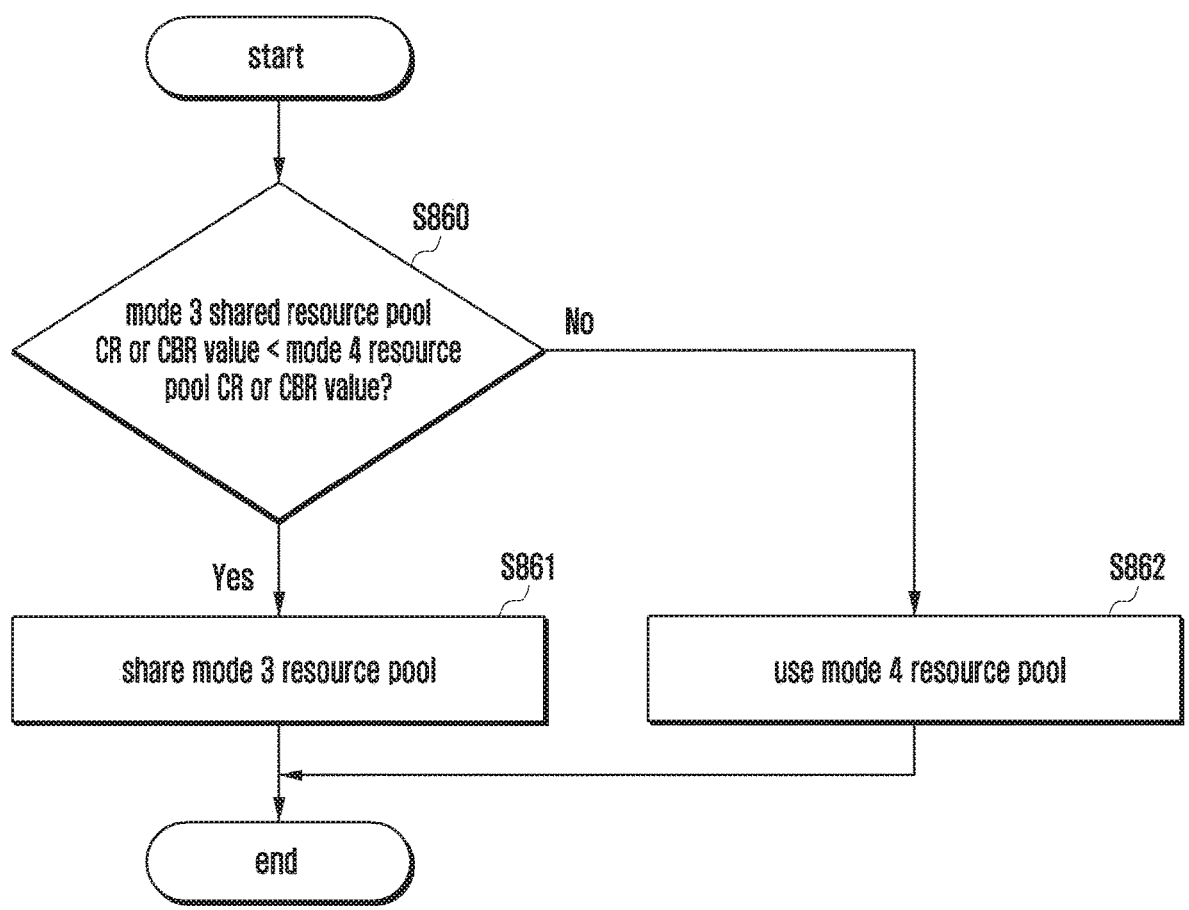

According to another disclosed embodiment, as shown in FIG. 8C, the mode 4 terminal may compare a CR or CBR value as a measurement result in the mode 3 shared resource pool and a CR or CBR value as a measurement result in the mode 4 dedicated resource pool to determine at step S860 whether the mode 3 shared resource pool CR or CBR value is less than the mode 4 dedicated resource pool CR or CBR value.

If it is determined that the mode 3 shared resource pool CR or CBR value is less than the mode 4 dedicated resource pool CR or CBR value, the mode 4 terminal may use the mode 3 shared resource pool at step S861.

If it is determined that the mode 3 shared resource pool CR or CBR value is not less than the mode 4 dedicated resource pool CR or CBR value, the mode 4 terminal may use the mode 4 resource pool at step S862.

Figure 8D:
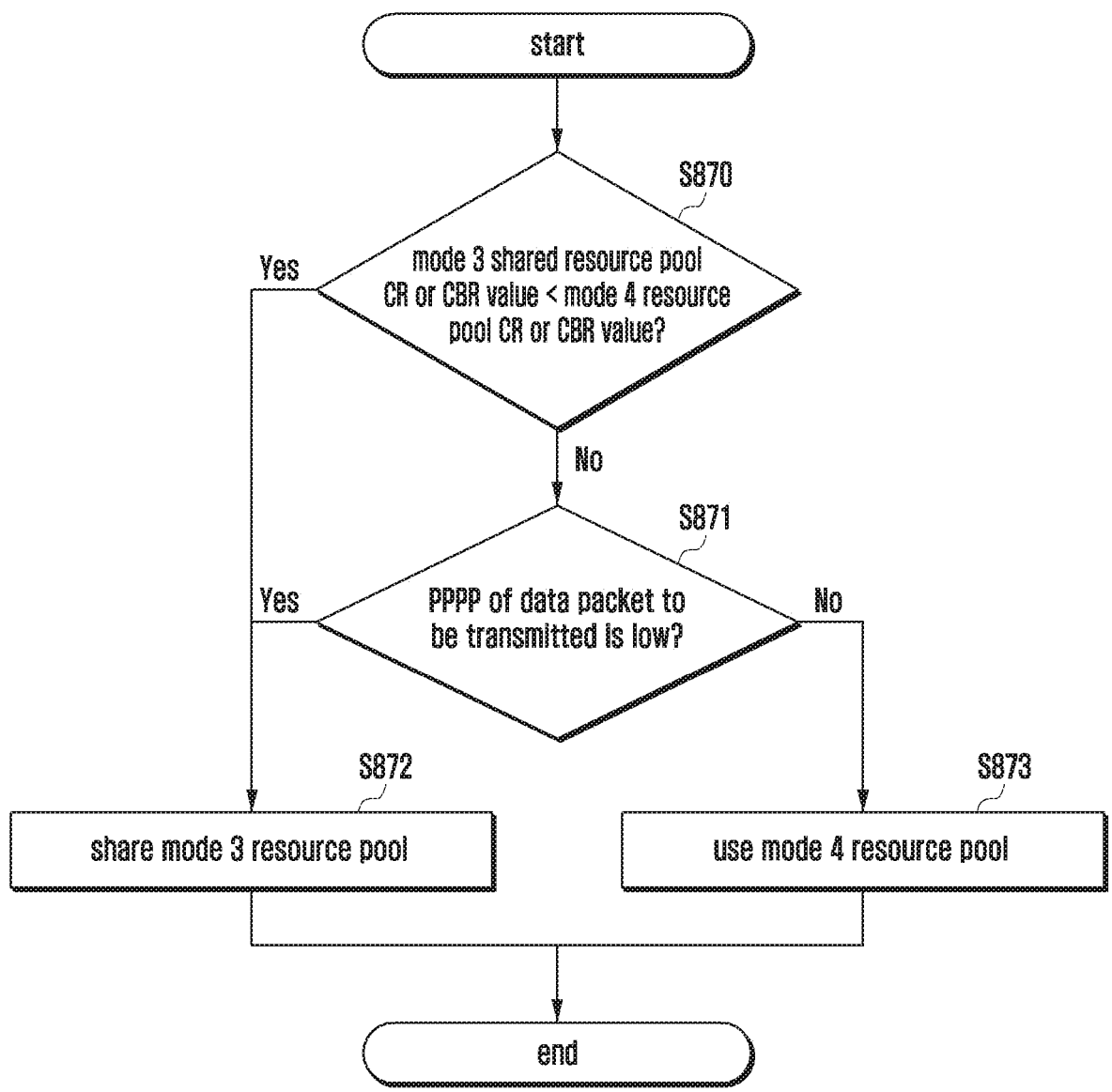

According to another disclosed embodiment, as shown in FIG. 8D, the mode 4 terminal may compare a CR or CBR value as a measurement result in the mode 3 shared resource pool and a CR or CBR value as a measurement result in the mode 4 dedicated resource pool to determine at step S870 whether the mode 3 shared resource pool CR or CBR value is less than the mode 4 dedicated resource pool CR or CBR value.

If it is determined that the mode 3 shared resource pool CR or CBR value is less than the mode 4 dedicated resource pool CR or CBR value, the mode 4 terminal may use the mode 3 shared resource pool at step S872.

If it is determined that the mode 3 shared resource pool CR or CBR value is not less than the mode 4 dedicated resource pool CR or CBR value, the mode 4 terminal may determine at step S871 whether a PPPP of a data packet to be transmitted is low. If it is determined that the PPPP of the data packet to be transmitted is low, the mode 4 terminal may use the mode 3 shared resource pool at step S872. If it is determined that the PPPP of the data packet to be transmitted is not low, the mode 4 terminal may use the mode 4 resource pool at step S873.

The detailed operation of the mode 3 terminal in the above embodiment is described hereinafter with reference to the flowcharts of FIGS. 9A and 9B.

Figure 9A:
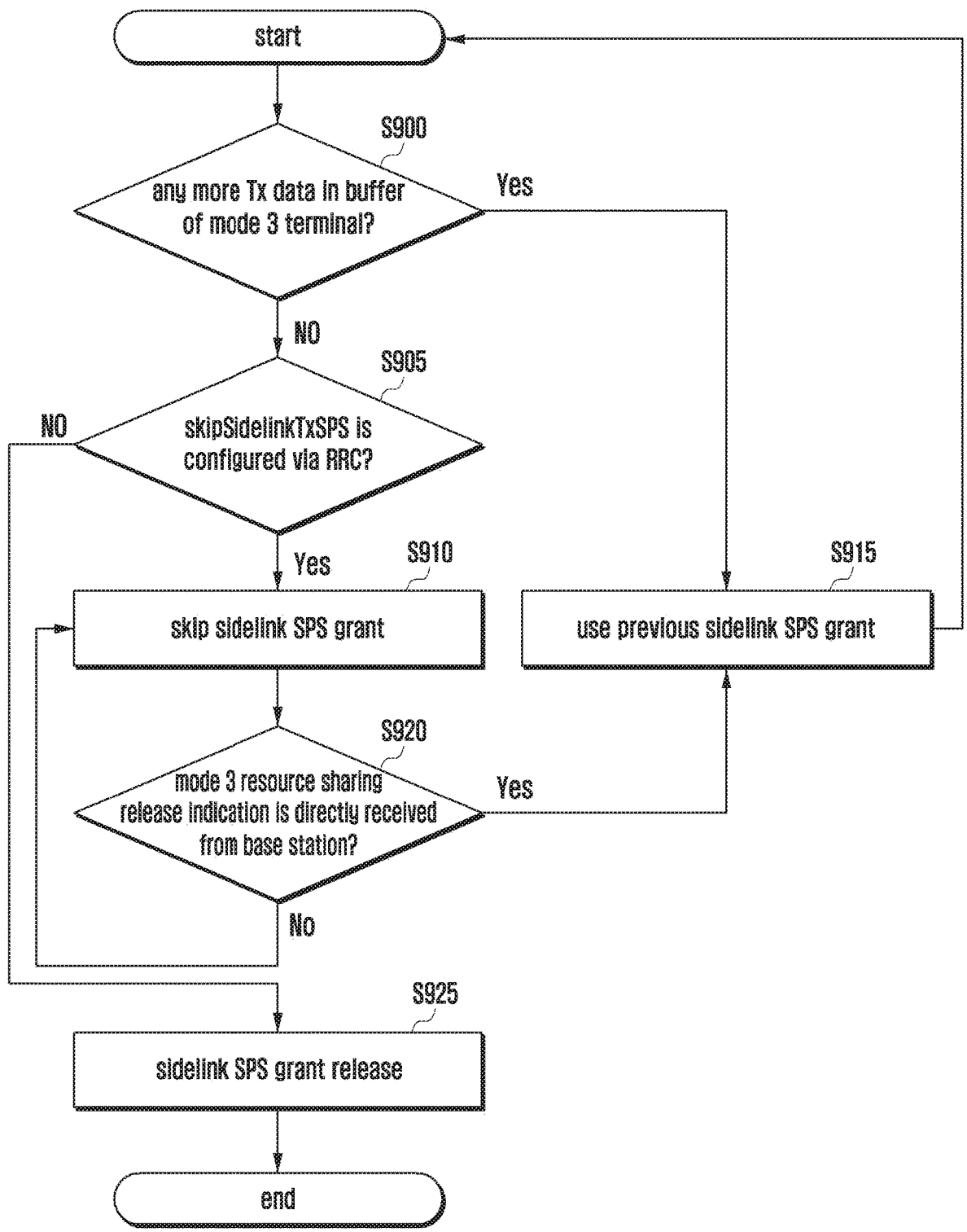
FIGS. 9A to 9C are diagrams illustrating operations of a mode 3 terminal in the procedures of FIGS. 5A, 5B, 6A, 6B, 7A, and 7B when a mode 3 shared radio resource pool is established for V2X communication according to disclosed embodiments.

For example, as shown in FIG. 9A, the mode 3 terminal may determine at step S900 whether there is any more data to transmit in its buffer. If it is determined that there is no more data to transmit in the buffer of the mode 3 terminal, the mode 3 terminal may determine at step S905 whether skipsidelinkTxSPS is configured via RRC. If the skipsidelinkTxSPS is configured, the mode 3 terminal may skip a sidelink grant at step S910. After skipping the sidelink grant, the mode 3 terminal may determine at step S920 whether a mode 3 resource sharing release indication is directly received from the base station. If the indication is not directly received from the base station, the procedure may return to step S910. If either the indication is directly received from the base station or it is determined at step S900 that there is data to transmit in the buffer of the mode 3 terminal, the mode 3 terminal may use the previous sidelink SPS grant at step S915. If it is determined at step S905 that no skipsidelinkTxSPS is configured via RRC, the mode 3 terminal may release the sidelink SPS grant at step S925.

Figure 9B:
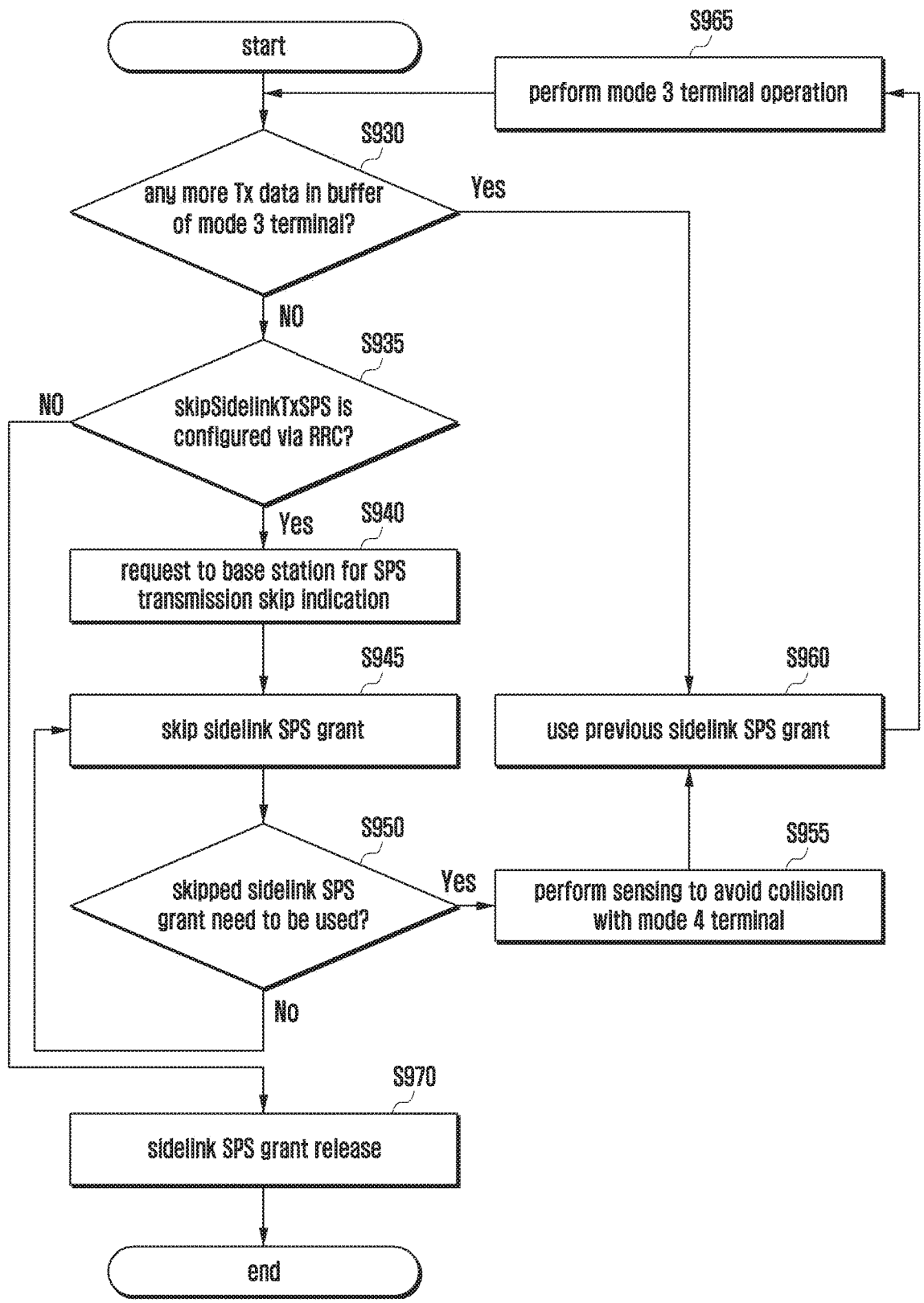

According to another disclosed embodiment, as shown in FIG. 9B, the mode 3 terminal may determine at step S930 whether there is any more data to transmit in its buffer. If it is determined that there is no more data to transmit in the buffer of the mode 3 terminal, the mode 3 terminal may determine at step S935 whether skipsidelinkTxSPS is configured via RRC. If the skipsidelinkTxSPS is configured, the mode 3 terminal may request to the base station for an SPS transmission skip indication at step S940. Next, the mode 3 terminal may skip a sidelink SPS grant at step S945. If it becomes necessary at step S950 to use the skipped sidelink SPS grant, the mode 3 terminal may perform sensing at step S955 to avoid collision with the mode 4 terminal. Next, the mode 3 terminal may use the previous sidelink SPS grant at step S960 to perform the mode 3 terminal operation at step S965. Meanwhile, if it is determined at step S930 the there is no data to transmit in the buffer of the mode 3 terminal, the mode 3 terminal may use the previous SPS grant at step S960. If it is determined at step S935 that no skipsidelinkTxSPS is configured via RRC, the mode 3 terminal may release the sidelink grant at step S970.

Figure 9C:
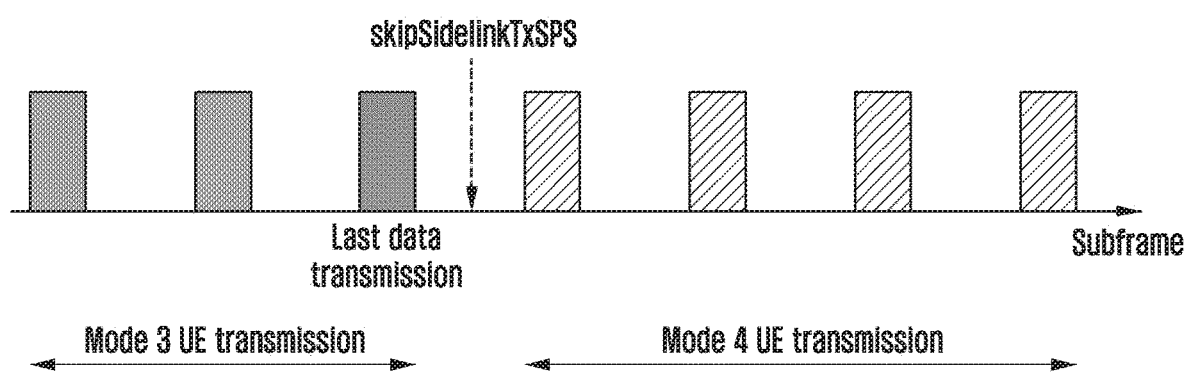

FIG. 9C is a diagram illustrating a configuration of skipsidelinkTxSPS via RRC when there is no data to transmit in a buffer of a mode 3 terminal at a certain time point. With the configuration of skipsidelinkTxSPS, if there is no data to transmit in the buffer of the mode 3 terminal, the mode 4 terminal may transmit data using idle resources of the SPS grant.

It may be possible to minimize any resource collision occurring when a shared resource pool is used, as follows, by exploiting sidelink control information (SCI) in the operation of the mode 3 terminal. Here, the SCI may be provided in a legacy SCI format 1 or a newly defined SCI format.

The SCI format 1 has a size of 32 bits including 7 reserved bits (32−(3+4+8+4+5+1)=7) assuming a maximum number of sidelink subchannels.

New information is added to the right most bit of the SCI format 1: This bit is set to 1 for indicating that a mode 3 shared resource pool is in use. For example, if it is allowed for a mode 4 terminal to use idle resources of a mode 3 terminal, the corresponding bit may indicate the resource sharing status of the mode 4 terminal. The mode 3 terminal may wait until the mode 4 terminal completes the transmission or transmit a grant resume indication request to the base station.

A resource reservation interval of the mode 4 terminal that is indicated by 4 resource reservation bits of the SCI format 1 is equal to an SPS periodicity value in the SPS configuration information of the mode 3 terminal ({20, 50, 100, 200, 300, 400, 500, 600, 700, 800, 900, 1000} ms in Release 14). That is, the 4 bits may imply both the configurations (mode 4 resource occupancy interval and mode 3 resource occupancy interval) (In legacy release 14, the SCI format 1 including a resource reservation field set to 0 is transmitted to provide information about the SPS periodicity of the mode 3 terminal). An exemplary mode 3 SPS terminal operation is to transmit the SCI format 1 including the resource reservation field set to a value indicating the SPS periodicity value. Upon receipt of the SCI format 1 from another terminal, the mode 4 terminal may check the information included in the resource reservation field for the resource use status of the shared resource pool to occupy resources necessary for V2X packet transmission.

For example, upon receipt of the message including information on the shared resource for V2X communication from the base station, the mode 3 terminal may configure the resource reservation field based on the shared resource information and the SPS periodicity configured to the mode 3 terminal. As another example, the mode 3 terminal may configure the resource reservation field based on the SPS periodicity configured to the mode 3 terminal. The mode 3 terminal may transmit a control message including the configured resource reservation field. For example, the mode 3 terminal may transmit the resource reservation field using the SCI format 1.

The resource reservation field of the SCI format 1 may include a short periodicity value for future ultra-low latency V2X communication. For example, the SPS periodicity of the mode 3 terminal or the resource reservation interval of the mode 4 terminal may be set to at least one of 1 ms, 2 ms, 3 ms, 4 ms, 5 ms, and 10 ms.

In an embodiment, the size of the resource reservation field of the SCI format 1 may be changed from 4 bits to 5 bits for supporting all of the short periodicity values for low latency. The periodicity value included in the SPS and the resource reservation interval configuration may be transmitted from the base station to the terminal. In this case, the periodicity value should be changed for the mode 3 SPS terminal and the mode 4 terminal under the same condition so as to be identified through scheduling assignment (SA) decoding, e.g., SCI format 1 decoding, in the case of using the shared resource pool. As an exemplary mode 3 SPS terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an embodiment, periodicity value configuration information may be included in the sidelink RRC Configuration for supporting a short periodicity value for low latency. For example, in Release 15, semiPersistSchedIntervalSL-r15 and SL-RestrictResourceReservationPeriod-r15 information elements may be added. The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an alternative embodiment, 3 or 4 periodicity values selected using 4 unsettled values in addition to the legacy periodicity values may be included in the sidelink RRC Configuration for supporting short periodicity values for low latency (e.g., select 3 or 4 among 1 ms, 2 ms, 3 ms, 4 ms, 5 ms, and 10 ms). The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

When the mode 4 terminal performs sensing and preoccupies the idle resources of the mode 3 terminal, it may be possible to avoid collision between the mode 3 and mode 4 terminals based on the SCI format 1 information.

Figure 6A:
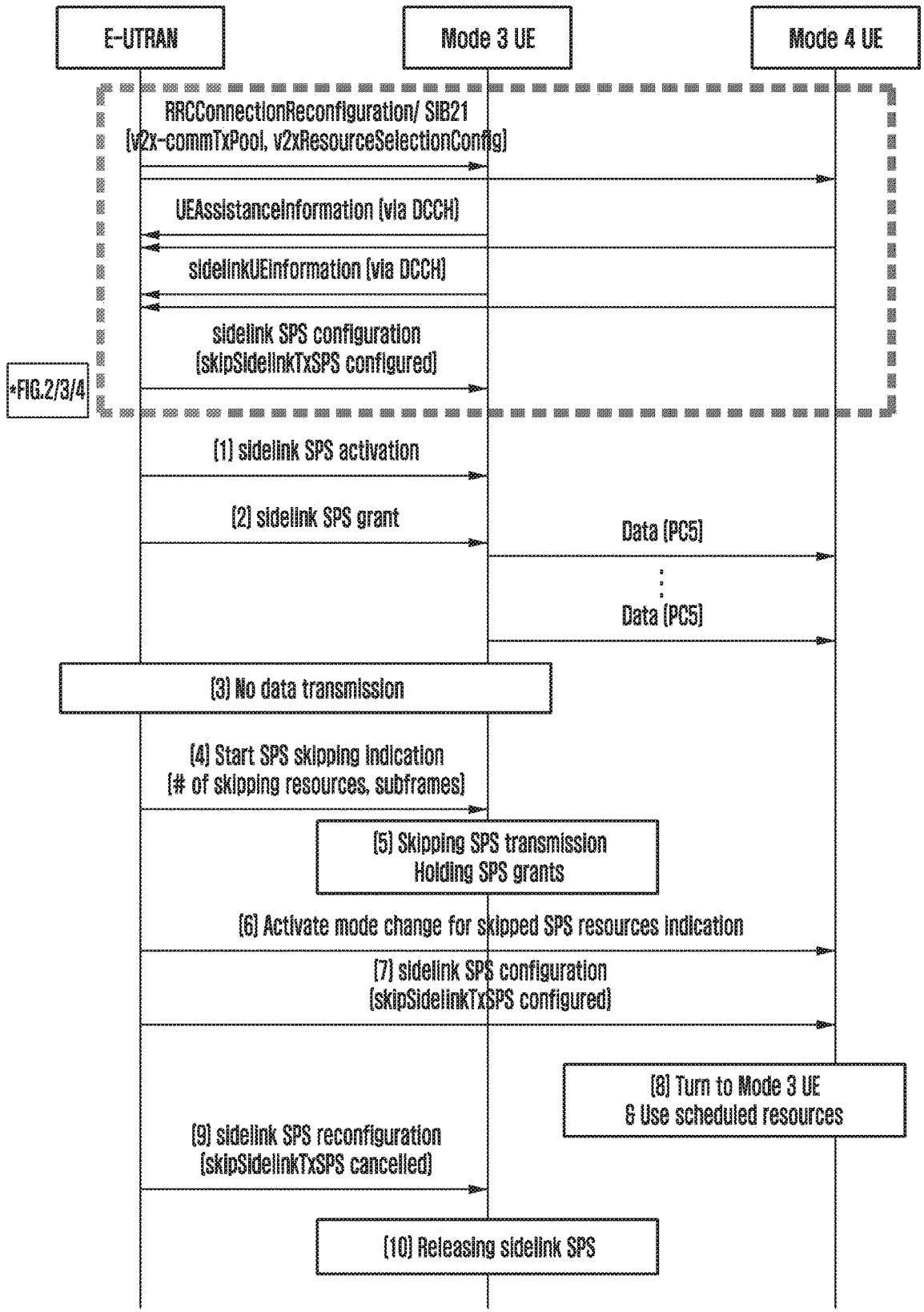
FIGS. 6A and 6B are signal flow diagrams illustrating a procedure for a base station to instruct mode 3 and mode 4 terminals to perform mode conversion when a mode 3 shared radio resource pool is established for V2X communication according to a disclosed embodiment.
Figure 6B:
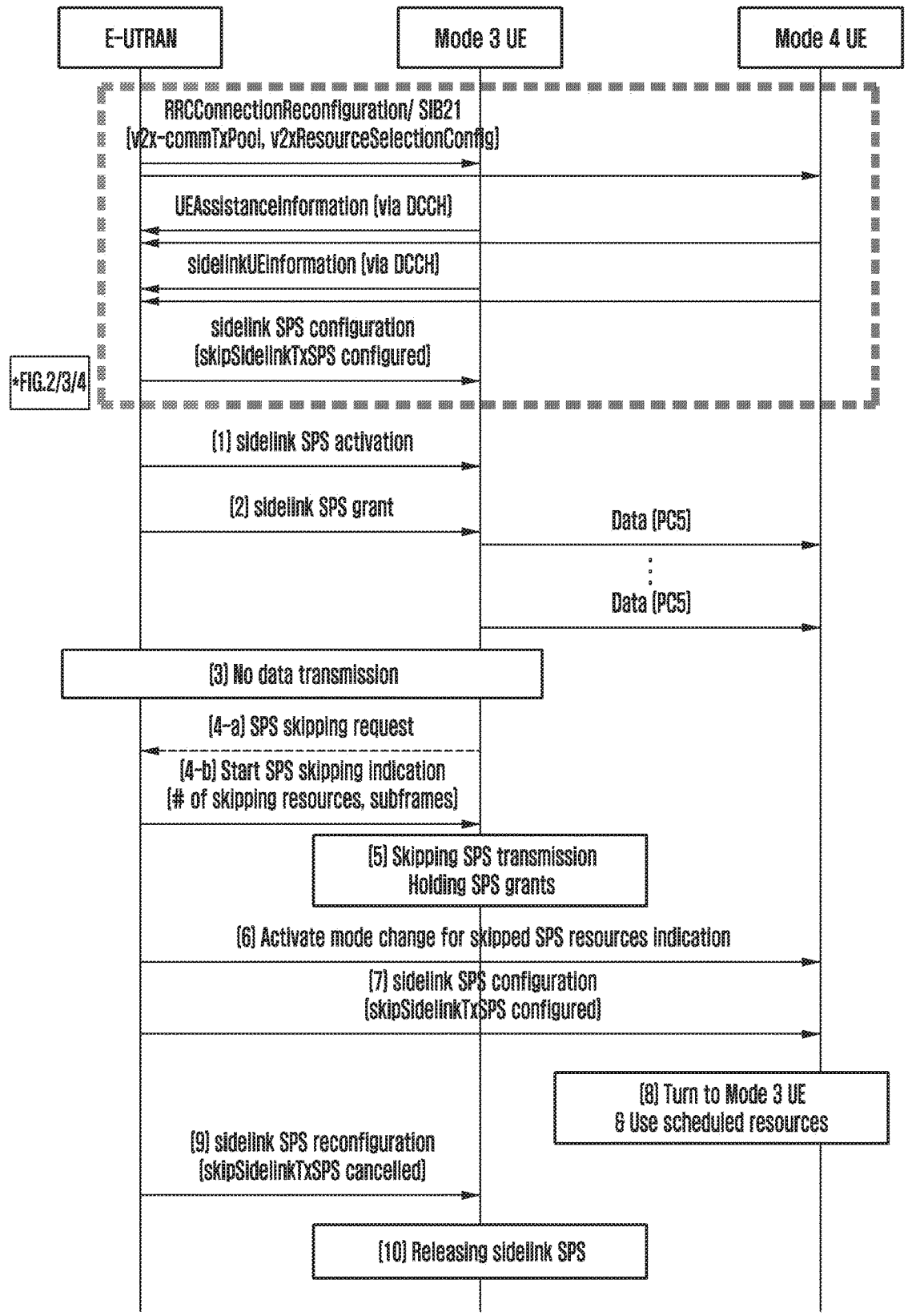

FIGS. 6A and 6B are signal flow diagrams illustrating a procedure for a base station to instruct mode 3 and mode 4 terminals to perform mode conversion when a mode 3 shared radio resource pool is established for V2X communication according to a disclosed embodiment.

FIGS. 6A and 6B show signal flows among the base station and the mode 3 and mode 4 terminals in a scenario where the base station provides the mode 3 and mode 4 terminals with SPS configuration information for mode conversion when a shared pool is established in the mode 3 radio resource pool for V2X communication according to disclosed embodiments. The shared radio resource pool is established and managed through RRC Connection Reconfiguration messages exchanged between the base station and the mode 3 terminal and between the base station and the mode 4 terminal and on the basis of the information in SIB 21 (see FIGS. 2, 3, and 4).

At steps (1) and (2), the base station activates sidelink semi-persistent scheduling (SPS) to allocate radio resources to the mode 3 terminal in order for the mode 3 terminal to perform sidelink communication using the allocated radio resources. If, at step (3), there is no more data to transmit on the allocated SPS radio resources, i.e., if the corresponding buffer of the mode 3 terminal is empty, the base station transmits an SPS transmission skip indication at step (4) as shown in FIG. 6A. In the embodiment of FIG. 6B, the mode 3 terminal transmits an SPS transmission skip request to the base station at step (4-*a*). The operation of step (4) of FIG. 6A, in which the base station provides instructions for skipping of SPS transmission, or steps (4-*a*) and (4-*b*) of FIG. 6B, in which the terminal requests for skipping of SPS transmission and the base station provides instructions for skipping of SPS transmission, may be performed in such a way that the mode 3 SPS terminal notifies the base station of no data to transmit as a buffer status report (BSR) operation and the base station transmits a downlink control information (DCI) 5A type message providing instructions for skipping of sidelink SPS. As an alternative operation of step (4-*b*) of FIG. 6B, the base station may notify the terminal of a number of subframes or resource units to skip transmission thereon along with a mode 3 SPS transmission skip indication. In only the case of when the skipSidelinkTxSPS is configured in the SPS configuration of the mode 3 terminal, the mode 3 terminal configured with skipSidelinkTxSPS and that has received the SPS transmission skip indication may skip SPS transmission while maintaining the SPS grant at step (5).

In order for the mode 4 terminal to use the idle SPS resources in the radio resource pool of the mode 3 terminal, the base station instructs the mode 4 terminal to operate as if it is a mode 3 terminal so as to use the SPS resources skipped at step (6). For the operation of step (6), the base station may use an RRC Connection Reconfiguration message to the mode 4 terminal or SIB 21. Upon receipt of the instruction, the mode 4 terminal may receive the SPS configuration information in use by the mode 3 terminal from the base station at step (7). The mode 4 terminal converts to mode 3 according to the instruction and transmits sidelink data using the SPS resources skipped by the mode 3 terminal. In order for the mode 4 terminal to perform sidelink data transmission, in an embodiment it may be possible to borrow the SPS configuration for sidelink data transmission or in another embodiment use resources that are dynamically scheduled by the base station in the SPS resources for sidelink data transmission. The mode 3 terminal receives an SPS transmission stop indication from the base station at step (9) and performs an SPS release operation at step (10).

In an embodiment, after completing sidelink data transmission on the skipped SPS resources in mode 3, the mode 4 terminal reverts to mode 4 according to an instruction from the base station.

In an alternative embodiment, the mode 4 terminal may ignore a number of transmission subframes or a number of resource units to be skipped as indicated at step (4-*b*) of FIG. 6B and can persistently perform an operation change.

The detailed operation of the mode 4 terminal in the above embodiment may be elaborated as described with reference to FIGS. 8A to 8D.

The detailed operation of the mode 3 terminal in the above embodiment may be elaborated as described with reference to FIGS. 9A to 9C.

It may be possible to minimize any resource collision occurring when a shared resource pool is used, as follows, by exploiting sidelink control information (SCI) in the operation of the mode 3 terminal. Here, the SCI may be provided in a legacy SCI format 1 or a newly defined SCI format.

The SCI format 1 has a size of 32 bits including 7 reserved bits (32−(3+4+8+4+5+1)=7) assuming a maximum number of sidelink subchannels.

New information is added to the right most bit of the SCI format 1: This bit is set to 1 for indicating that a mode 3 shared resource pool is in use. For example, if it is allowed for a mode 4 terminal to use idle resources of a mode 3 terminal, the corresponding bit may indicate a resource sharing status of the mode 4 terminal. The mode 3 terminal may wait until the mode 4 terminal completes the transmission or transmit a grant resume indication request to the base station.

A resource reservation interval of the mode 4 terminal that is indicated by 4 resource reservation bits of the SCI format 1 is equal to an SPS periodicity value in the SPS configuration information of the mode 3 terminal ({20, 50, 100, 200, 300, 400, 500, 600, 700, 800, 900, 1000} ms in Release 14). That is, the 4 bits may imply both the configurations (mode 4 resource occupancy interval and mode 3 resource occupancy interval) (In legacy release 14, the SCI format 1 including a resource reservation field set to 0 is transmitted to provide information about the SPS periodicity of the mode 3 terminal). An exemplary mode 3 SPS terminal operation is to transmit the SCI format 1 including the resource reservation field set to a value indicating the SPS periodicity value. Upon receipt of the SCI format 1 from another terminal, the mode 4 terminal may check the information included in the resource reservation field for the resource use status of the shared resource pool to occupy resources necessary for V2X packet transmission.

The resource reservation field of the SCI format 1 may include a short periodicity value for future ultra-low latency V2X communication. For example, the SPS periodicity of the mode 3 terminal or the resource reservation interval of the mode 4 terminal may be set to at least one of 1 ms, 2 ms, 3 ms, 4 ms, 5 ms, and 10 ms.

In an embodiment, the size of the resource reservation field of the SCI format 1 may be changed from 4 bits to 5 bits for supporting all of the short periodicity values for low latency. The periodicity value included in the SPS and the resource reservation interval configuration may be transmitted from the base station to the terminal. In this case, the periodicity value should be changed for the mode 3 terminal and the mode 4 terminal under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an embodiment, periodicity value configuration information may be included in the sidelink RRC Configuration for supporting a short periodicity value for low latency. For example, in Release 15, semiPersistSched-IntervalSL-r15 and SL-RestrictResourceReservation-Period-r15 information elements may be added. The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an alternative embodiment, 3 or 4 periodicity values selected using 4 unsettled values in addition to the legacy periodicity values may be included in the sidelink RRC Configuration for supporting short periodicity values for low latency (e.g., select 3 or 4 among 1 ms, 2 ms, 3 ms, 4 ms, 5 ms, and 10 ms). The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

When the mode 4 terminal performs sensing and preoccupies the idle resources of the mode 3 terminal, it may be possible to avoid collision between the mode 3 and mode 4 terminals based on the SCI format 1 information.

Figure 7A:
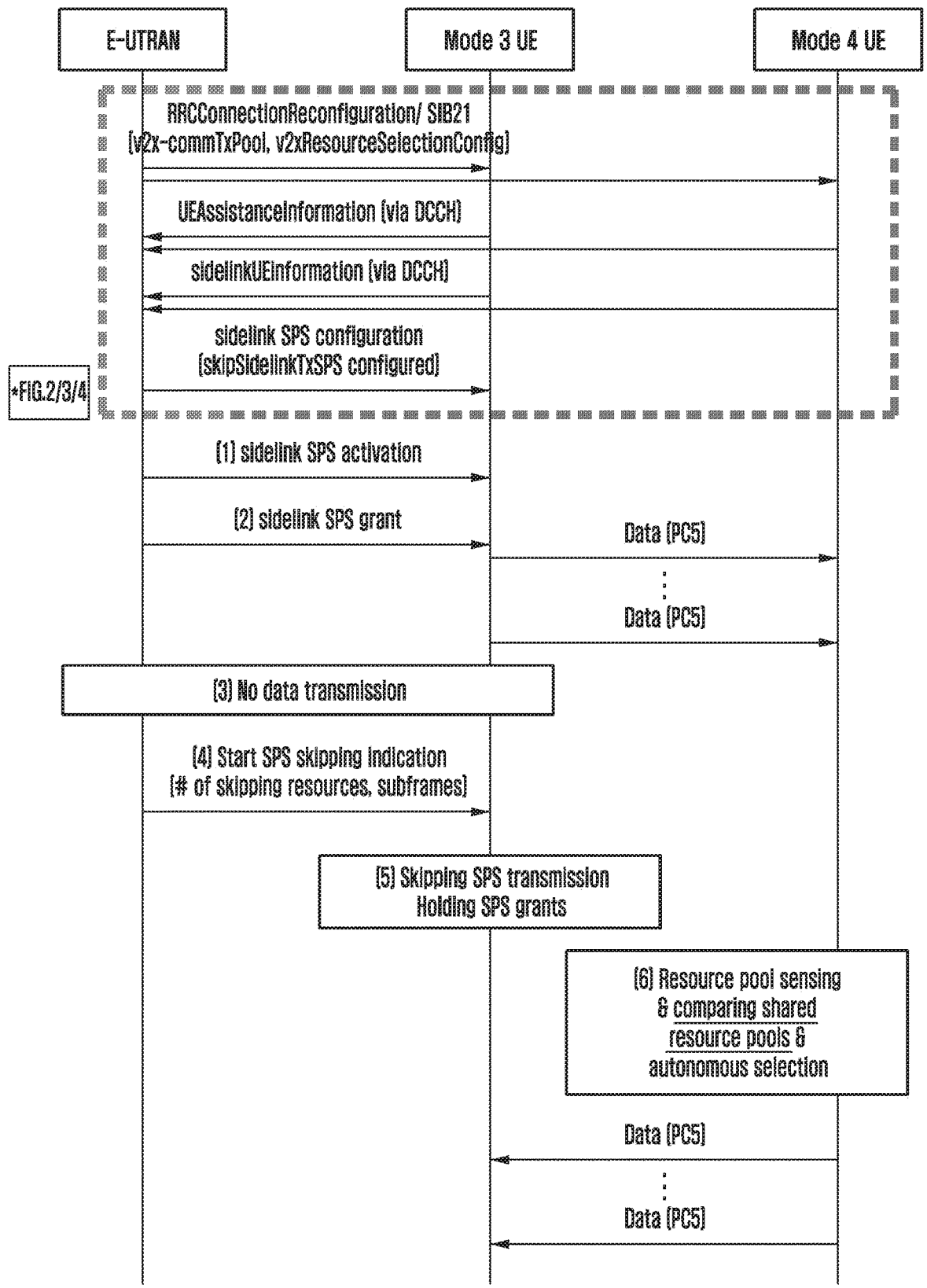
FIGS. 7A and 7B are signal flow diagrams illustrating a procedure for a mode 4 terminal to use a mode 3 shared resource pool without any information from a base station when a mode 3 share radio resource pool is established for V2X communication according to a disclosed embodiment.
Figure 7B:
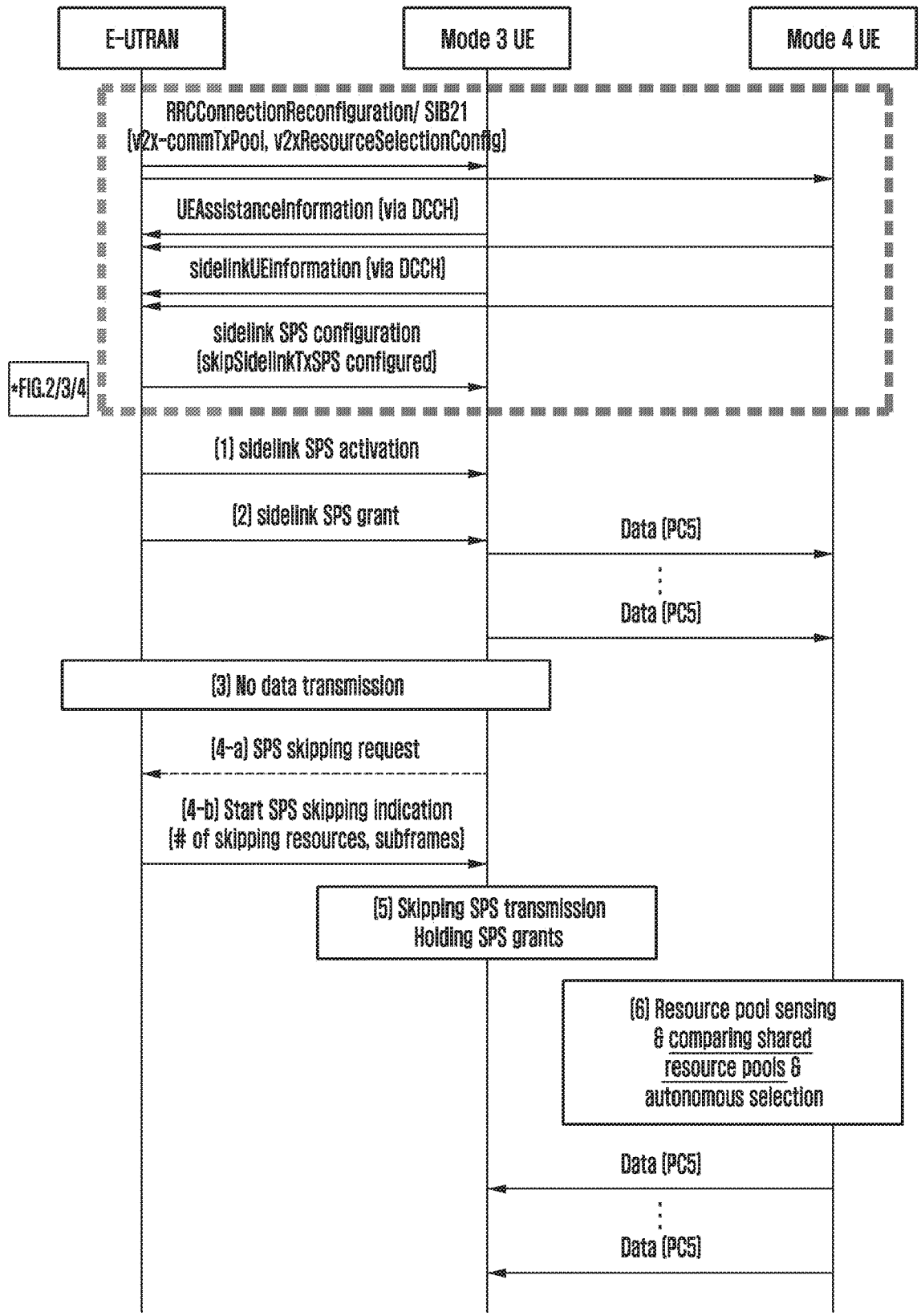

FIGS. 7A and 7B are signal flow diagrams illustrating a procedure for a mode 4 terminal to use a mode 3 shared resource pool without any information from a base station when a mode 3 share radio resource pool is established for V2X communication according to a disclosed embodiment.

FIGS. 7A and 7B show signal flows among the base station and the mode 3 and mode 4 terminals in a scenario where the mode 4 terminal uses the shared resource pool without any information or indication from the base station when a shared pool is established in the mode 3 radio resource pool for V2X communication according to disclosed embodiments. The shared radio resource pool is established and managed through RRC Connection Reconfiguration messages exchanged between the base station and the mode 3 terminal and between the base station and the mode 4 terminal and on the basis of the information in SIB 21 (see FIGS. 2, 3, and 4).

At steps (1) and (2), the base station activates sidelink semi-persistent scheduling (SPS) to allocate radio resources to the mode 3 terminal in order for the mode 3 terminal to perform sidelink communication using the allocated radio resources. If, at step (3), there is no more data to transmit on the allocated SPS radio resources, i.e., if the corresponding buffer of the mode 3 terminal is empty, the base station transmits an SPS transmission skip indication at step (4) as shown in FIG. 7A. In the embodiment of FIG. 7B, the mode 3 terminal transmits an SPS transmission skip request to the base station at step (4-*a*). The operation of step (4) of FIG. 7A, in which the base station provides instructions for skipping of SPS transmission, or steps (4-*a*) and (4-*b*) of FIG. 7B, in which the terminal requests for skipping of SPS transmission and the base station provides instructions for skipping of SPS transmission, may be performed in such a way that the mode 3 SPS terminal notifies the base station of no data to transmit as a buffer status report (BSR) operation and the base station transmits a downlink control information (DCI) 5A type message providing instructions to skip sidelink SPS. As an alternative operation of step (4-*b*) of FIG. 7B, the base station may notify the terminal of a number of subframes or resource units to skip transmission thereon along with a mode 3 SPS transmission skip indication. In only the case of when the skipSidelinkTxSPS is configured in the SPS configuration of the mode 3 terminal, the mode 3 terminal configured with skipSidelinkTxSPS and that has received the SPS transmission skip indication may skip SPS transmission while maintaining the SPS grant at step (5).

If it has data to transmit, the mode 4 terminal continuously performs a terminal-autonomous resource sensing and selection operation in the shared radio resource pool. If the mode 4 terminal does not know a use timing of the SPS idle resource of the mode 3 terminal as in the above scenario, it may compare a mode 4 dedicated resource pool and the mode 3 shared resource pool and, if there are shared resources available for use, selectively use the resources under a condition. For example, the mode 4 terminal may perform channel occupancy rate (CR) or channel busy ratio (CBR) measurement in the mode 4 dedicated resource pool and the mode 3 shared resource pool and, if the CR or CBR value of the mode 3 shared resource pool is low, select the mode 3 shared resource pool for use. In this case, the mode 3 shared resources selected for use may correspond to either the SPS idle resources or SPS non-idle resources (i.e., normal mode 3 idle resource).

According to another disclosed embodiment, the mode 4 terminal may check proximity service per-packet priorities (PPPPs) of data packets to be transmitted and transmit the packets, using the mode 3 resource pool, in lowest priority first order. According to another disclosed embodiment, it may also be possible for the mode 4 terminal to transmit the data packets using the mode 3 resource pool in highest PPPP first order. The operation of using the resource pool based on PPPP may vary according to the status of the resource pool in which the mode 4 terminal performs resource sensing.

The detailed operation of the mode 4 terminal in the above embodiment may be elaborated as described with reference to FIGS. 8A to 8D.

The detailed operation of the mode 3 terminal in the above embodiment may be elaborated as described with reference to FIGS. 9A to 9C.

It may be possible to minimize any resource collision occurring when a shared resource pool is used, as follows, by exploiting sidelink control information (SCI) in the operation of the mode 3 terminal. Here, the SCI may be provided in a legacy SCI format 1 or a newly defined SCI format.

The SCI format 1 has a size of 32 bits including 7 reserved bits (32−(3+4+8+4+5+1)=7) assuming a maximum number of sidelink subchannels.

New information is added to the right most bit of the SCI format 1: This bit is set to 1 for indicating that a mode 3 shared resource pool is in use. For example, if it is allowed for a mode 4 terminal to use idle resources of a mode 3 terminal, the corresponding bit may indicate a resource sharing status of the mode 4 terminal. The mode 3 terminal may wait until the mode 4 terminal completes the transmission or transmit a grant resume indication request to the base station.

A resource reservation interval of the mode 4 terminal that is indicated by 4 resource reservation bits of the SCI format 1 is equal to an SPS periodicity value in the SPS configuration information of the mode 3 terminal ({20, 50, 100, 200, 300, 400, 500, 600, 700, 800, 900, 1000} ms in Release 14). That is, the 4 bits may imply both the configurations (mode 4 resource occupancy interval and mode 3 resource occupancy interval) (In legacy release 14, the SCI format 1 including a resource reservation field set to 0 is transmitted to provide information about the SPS periodicity of the mode 3 terminal). An exemplary mode 3 SPS terminal operation is to transmit the SCI format 1 including the resource reservation field set to a value indicating the SPS periodicity value. Upon receipt of the SCI format 1 from another terminal, the mode 4 terminal may check the information included in the resource reservation field for the resource use status of the shared resource pool to occupy resources necessary for V2X packet transmission.

The resource reservation field of the SCI format 1 may include a short periodicity value for future ultra-low latency V2X communication. For example, the SPS periodicity of the mode 3 terminal or the resource reservation interval of the mode 4 terminal may be set to at least one of 1 ms, 2 ms, 3 ms, 4 ms, 5 ms, and 10 ms.

In an embodiment, the size of the resource reservation field of the SCI format 1 may be changed from 4 bits to 5 bits for supporting all of the short periodicity values for low latency. The periodicity value included in the SPS and the resource reservation interval configuration may be transmitted from the base station to the terminal. In this case, the periodicity value should be changed for the mode 3 terminal and the mode 4 terminal under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an embodiment, periodicity value configuration information may be included in the sidelink RRC Configuration for supporting a short periodicity value for low latency. For example, in Release 15, semiPersistSched-IntervalSL-r15 and SL-RestrictResourceReservation-Period-r15 information elements may be added. The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an alternative embodiment, 3 or 4 periodicity values selected using 4 unsettled values in addition to the legacy periodicity values may be included in the sidelink RRC Configuration for supporting short periodicity values for low latency (e.g., select 3 or 4 among 1 ms, 2 ms, 3 ms, 4 ms, 5 ms, and 10 ms). The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

When the mode 4 terminal performs sensing and preoccupies the idle resources of the mode 3 terminal, it may be possible to avoid collision between the mode 3 and mode 4 terminals based on the SCI format 1 information.

FIGS. 8A to 8D are flowcharts illustrating operations of a mode 4 terminal in the procedures of FIGS. 5A, 5B, 6A, 6B, 7A, and 7B when a mode 3 shared radio resource pool is established for V2X communication according to disclosed embodiments.

FIG. 8A is a flowchart illustrating an operation of a mode 4 terminal when a shared pool is established in a mode 3 radio resource pool for V2X communication in the procedures of FIGS. 5A and 5B according to a disclosed embodiment. Descriptions are made of the operations of the mode 4 terminal hereinafter with reference to the accompanying drawings.

For example, if the mode 4 terminal receives an indication indicating a use timing of idle resources in the shared resource pool of the mode 3 terminal directly from the base station, it performs sidelink communication using the mode 3 shared resource pool.

As another example, if the mode 4 terminal does now receive an indication indicating a use timing of idle resources in the shared resource pool of the mode 3 terminal directly from the base station, it performs sidelink communication using a mode 4 dedicated resource pool.

FIG. 8B is a flowchart illustrating an operation of a mode 4 terminal when a shared pool is established in a mode 3 radio resource pool for V2X communication in the procedures of FIGS. 6A and 6B according to a disclosed embodiment. A description is made of the operation of the mode 4 terminal hereinafter with reference to the accompanying drawings.

For example, if the mode 4 terminal receives an indication for conversion to mode 3 directly from the base station and wants to use the idle resources of the mode 3 terminal, it converts to mode 3.

As an another example, if the mode 4 terminal does not receive an indication for conversion to mode 3 directly from the base station, it stays in mode 4.

FIGS. 8C and 8D are flowcharts illustrating operations of a mode 4 terminal in the procedures of FIGS. 7A and 7B when a mode 3 shared radio resource pool is established in the mode 3 radio resource pool for V2X communication according to disclosed embodiments. Descriptions are made of the operations of the mode 4 terminal hereinafter with reference to the accompanying drawings.

For example, if the mode 4 terminal does not receive any indication from the base station, it compares a CR or CBR value as a mode 3 shared resource pool sensing result with a CR or CBR value as a mode 4 dedicated resource pool sensing result and, if the CR or CBR value of the mode 3 shared resource pool is less than the CR or CBR value of the mode 4 dedicated resource pool, selects resources in the mode 3 shared resource pool to perform sidelink communication.

As shown in FIG. 8C, the mode 4 terminal compares the CR or CBR value as a mode 3 shared resource pool sensing result with the CR or CBR value as a mode 4 dedicated resource pool sensing result to determine at step S860 whether the mode 3 shared resource pool is less than the CR or CBR value of the mode 4 dedicated resource pool.

If it is determined that the CR or CBR value of the mode 3 shared resource pool is less than the CR or CBR value of the mode 4 dedicated resource pool, the mode 4 terminal may share the mode 3 resource pool at step S861.

If it is determined that the CR or CBR value of the mode 3 shared resource pool is not less than the CR or CBR value of the mode 4 dedicated resource pool, the mode 4 terminal may use the mode 4 resource pool.

As another example, if the mode 4 terminal does not receive any indication from the base station, even though the CR or CBR value of the mode 4 dedicated resource pool is less than the CR or CBR value of the mode 3 shared resource pool as a comparison result, if the PPPP value of the data packet is low (i.e., priority of the packet is high), it may select resources in the mode 3 shared resource pool to transmit the corresponding packet through sidelink communication. The PPP comparison condition may be able to be reverted (i.e., PPPP value of the data packet is high (i.e., priority of the packet is low).

As another example, if the mode 4 terminal does not receive any indication from the base station, the CR or CBR value of the shared resource pool is less than that of the mode 4 dedicated resource pool, and the PPPP value of the data packet to be transmitted is high (i.e., priority of the packet is low), it cannot use the mode 3 shared resource pool and thus selects resources in the mode 4 dedicated resource pool for sidelink communication. The PPPP comparison condition may be able to be reverted (i.e., PPPP value of the data packet is low (i.e., priority of the packet is high)). It may be possible to use a PPPP threshold value (PPPP_Threshold) to determine whether the PPPP value of the data packet is low or high.

In detail, as shown in FIG. 8D, the mode 4 terminal may compare the CR or CBR value as the mode 3 shared resource pool sensing result and the CR or CBR value as the mode 4 dedicated resource pool sensing result to determine at step S870 whether the CR or CBR value of the mode 3 shared resource pool is less than that of the mode 4 dedicated resource pool.

If it is determined that the CR or CBR value of the mode 3 shared resource pool is less than that of the mode 4 dedicated resource pool, the mode 4 terminal may share the mode 3 resource pool at step S872.

If it is determined that the CR or CBR value of the mode 3 shared resource pool is not less than that of the mode 4 dedicated resource pool, the mode 4 terminal may determine at step S871 whether the PPPP of the data packet to be transmitted is low. If it is determined that the PPPP of the data packet to be transmitted is low, the mode 4 terminal may share the mode 3 resource pool at step S872. If it is determined that the PPPP of the data packet to be transmitted is not low, the mode 4 terminal may use the mode 4 resource pool at step S873.

In the case of using the shared resource pool of the mode 3 terminal without any indication from the base station as in the embodiments of FIGS. 7A and 7B, the mode 4 terminal may perform one-time packet transmission using the selected mode 3 shared resources. That is, the mode 4 terminal is not allowed to perform transmission multiple times on the shared resource pool of the mode 3 terminal. Allowing the mode 4 terminal to perform just one-time packet transmission aims to minimize a waiting time of the mode 3 terminal when a data packet to be transmitted on the shared resources is generated at the mode 3 terminal. This makes it possible to minimize the collision risk caused by use of the same resources between the mode 3 and mode 4 terminals in a situation where the mode 4 terminal does not know whether the mode 3 shared resources are in use.

FIGS. 9A to 9C are diagrams illustrating operations of a mode 3 terminal in the procedures of FIGS. 5A, 5B, 6A, 6B, 7A, and 7B when a mode 3 shared radio resource pool is established for V2X communication according to disclosed embodiments.

FIG. 9A is a flowchart illustrating an operation of a mode 3 terminal in the procedures of FIGS. 5A, 5B, 6A, 6B, 7A, and 7B when a mode 3 shared radio resource pool is established for V2X communication according to a disclosed embodiment. The embodiment of FIG. 9A is directed to the SPS idle resource reuse of a mode 4 terminal upon receipt of skipSidelinkTxSPS in a situation where periodic SPS resources are configured for a mode 3 terminal, which skips and resumes the use of the SPS radio resources. The operation of FIG. 9A may be performed at a medium access control (MAC) entity with the exception of skipSidelinkTxSPS in the RRC SPS configuration. Descriptions are made of the operations of the mode 3 terminal hereinafter with reference to the accompanying drawings.

For example, in the case where there is no more data to transmit in the buffer of the mode 3 terminal, if skipSidelinkTxSPS has been previously configured via RRC, the mode 3 terminal skips sidelink transmission while maintaining the SPS grant. According to an embodiment, in the case where the sidelink transmission is skipped because of the configuration of skipSidelinkTxSPS, if a mode 3 resource sharing release indication is directly received from the base station in the state where SPS grant for the mode 3 terminal is skipped, the mode 3 terminal resumes using the maintained SPS grant to perform sidelink transmission. In the case where the mode 3 resource sharing release indication is not received from the base station, the SPS grant skip is maintained.

As another example, in the case where there is data to transmit in the buffer of the mode 3 terminal, the mode 3 terminal maintains the sidelink SPS grant to perform a normal mode 3 operation.

As another example, in the case where there is no more data to transmit in the buffer of the mode 3 terminal, if skipSidelinkTxSPS has not been configured via RRC, the mode 3 terminal releases the SPS grant and stops SPS-based sidelink transmission.

FIG. 9B is a flowchart illustrating an operation of a mode 3 terminal for requesting to a base station for SPS transmission skip without any indication from the base station in the procedures of FIGS. 5A, 5B, 6A, 6B, 7A, and 7B when a mode 3 shared radio resource pool is established for V2X communication. According to an embodiment, in the case where the mode 3 terminal does not perform a buffer status report (BSR), even though the base station has allocated SPS transmission resources to the mode 3 terminal, the mode 3 terminal may transmit a separate message to the base station to request for SPS transmission skip. Examples of the SPS transmission skip request message may include an RRC message, a MAC control element (CE) message, and a uplink control information (UCI) message.

In the embodiment of FIG. 9B, in the case where the mode 3 terminal wants to resume using the SPS transmission resources, upon detection of arrival of data to be transmitted in the buffer, without any indication from the base station, it performs resource pool sensing to determine whether there is a mode 4 terminal occupying the idle resources skipped by the mode 3 terminal. The above operation for avoiding resource use collision between the mode 3 and mode 4 terminals may be applicable to the cases where the mode 3 terminal is operating in an independent resource pool and a shared resource pool.

Figure 10:
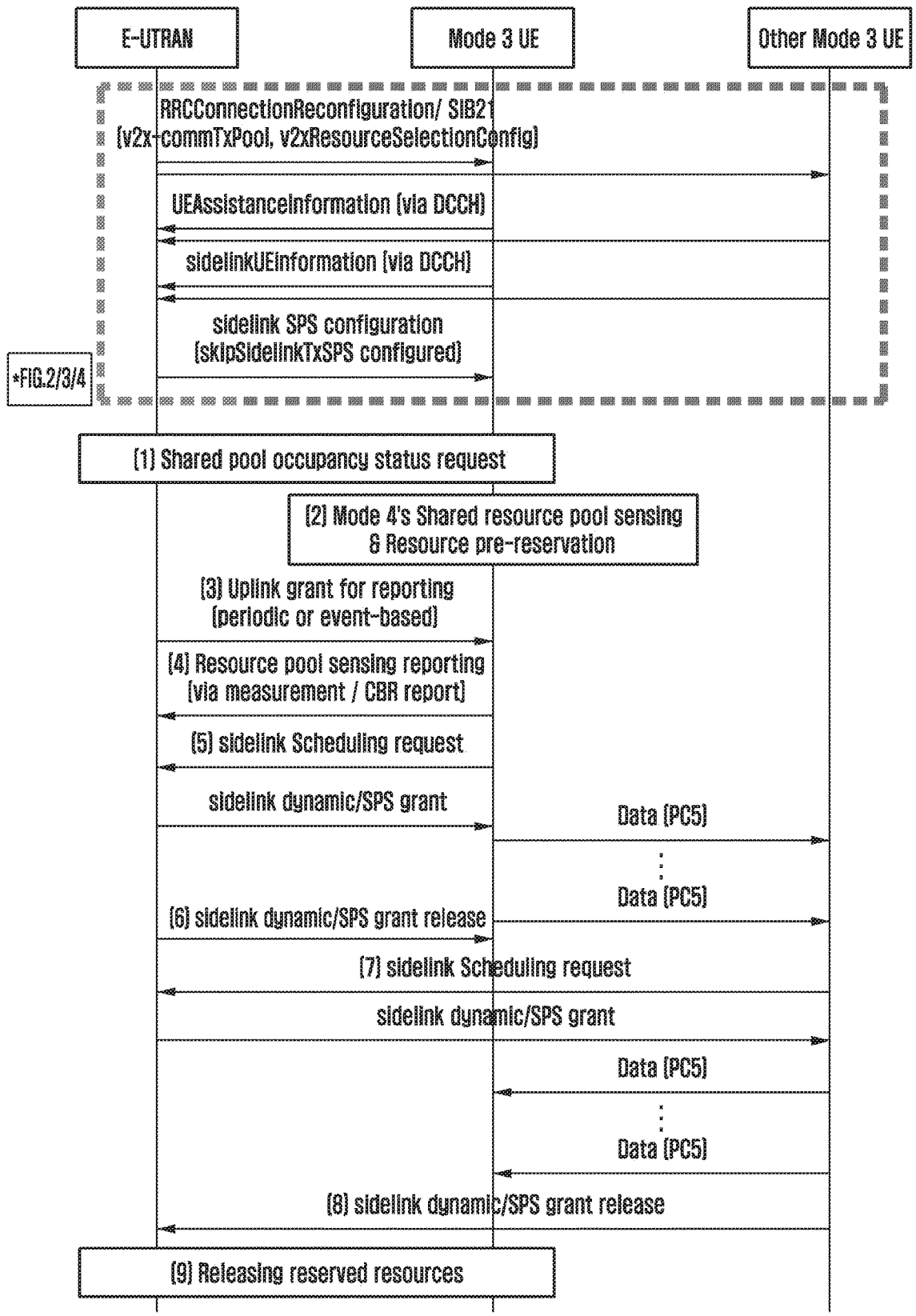
FIG. 10 is a signal flow diagram illustrating a procedure in which a mode 3 terminal is sensing and a base station selects resources when a mode 4 shared radio resource pool is established for V2X communication according to a disclosed embodiment.

FIG. 10 is a signal flow diagram illustrating a procedure in which a mode 3 terminal is sensing and a base station selects resources when a mode 4 shared radio resource pool is established for V2X communication according to a disclosed embodiment.

FIG. 10 shows signal flows among a base station and mode 3 terminals in a scenario where a mode 3 terminal senses a mode 4 shared radio resource pool and reports the sensing result to the base station in order for the base station to assign resources when a shared pool is established in a mode 4 radio resource pool for V2X communication according to a disclosed embodiment. The shared radio resource pool is established and managed through RRC Connection Reconfiguration message exchange between the base station and the mode 3 terminal and between the base station and the mode 4 terminal and on the basis of the information in SIB 21 (see FIGS. 2, 3, and 4).

At step (1), a mode 4 shared radio resource pool status request is transmitted from the base station to a mode 3 terminal. According to an embodiment, the base station may directly instruct the mode 3 terminal to sense the mode 4 shared resource pool at step (1). According to another embodiment, the mode 3 terminal may be configured to sense the mode 4 shared resource pool in response to a higher layer message or indication or periodically.

The mode 3 terminal performs sensing in response to an indication or periodically performs mode 4 shared resource pool sensing and occupies radio resources for use in the mode 4 shared resource pool based on a measurement value indicative of a resource pool occupancy status such as CR or CBR. A description is made of step (2) hereinafter (here, the SCI may be provided in a legacy SCI format 1 or a newly defined SCI format).

The SCI format 1 has a size of 32 bits including 7 reserved bits (32−(3+4+8+4+5+1)=7) assuming a maximum number of sidelink subchannels.

New information is added to the right most bit of the SCI format 1: This bit is set to 1 for indicating that a mode 3 shared resource pool is in use. For example, if it is allowed for a mode 4 terminal to use idle resources of a mode 3 terminal, the corresponding bit may indicate a resource sharing status of the mode 4 terminal. The mode 3 terminal may wait until the mode 4 terminal completes the transmission or transmit a grant resume indication request to the base station.

A resource reservation interval of the mode 4 terminal that is indicated by 4 resource reservation bits of the SCI format 1 is equal to an SPS periodicity value in the SPS configuration information of the mode 3 terminal ({20, 50, 100, 200, 300, 400, 500, 600, 700, 800, 900, 1000} ms in Release 14). That is, the 4 bits may imply both the configurations (mode 4 resource occupancy interval and mode 3 resource occupancy interval) (In legacy release 14, the SCI format 1 including a resource reservation field set to 0 is transmitted to provide information about the SPS periodicity of the mode 3 terminal). An exemplary mode 3 SPS terminal operation is to transmit the SCI format 1 including the resource reservation field set to a value indicating the SPS periodicity value. Upon receipt of the SCI format 1 from another terminal, the mode 4 terminal may check the information included in the resource reservation field for the resource use status of the shared resource pool to occupy resources necessary for V2X packet transmission.

The resource reservation field of the SCI format 1 may include a short periodicity value for future ultra-low latency V2X communication. For example, the SPS periodicity of the mode 3 terminal or the resource reservation interval of the mode 4 terminal may be set to at least one of 1 ms, 2 ms, 3 ms, 4 ms, 5 ms, and 10 ms.

In an embodiment, the size of the resource reservation field of the SCI format 1 may be changed from 4 bits to 5 bits for supporting all of the short periodicity values for low latency. The periodicity value included in the SPS and the resource reservation interval configuration may be transmitted from the base station to the terminal. In this case, the periodicity value should be changed for the mode 3 terminal and the mode 4 terminal under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an embodiment, periodicity value configuration information may be included in the sidelink RRC Configuration for supporting a short periodicity value for low latency. For example, in Release 15, semiPersistSched-IntervalSL-r15 and SL-RestrictResourceReservation-Period-r15 information elements may be added. The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

In an alternative embodiment, 3 or 4 periodicity values selected using 4 unsettled values in addition to the legacy periodicity values may be included in the sidelink RRC Configuration for supporting short periodicity values for low latency (e.g., select 3 or 4 among 1 ms, 2 ms, 3 ms, 4 ms, 5 ms, and 10 ms). The base station may determine the periodicity value to be additionally configured autonomously or based on a traffic pattern, a delay budget, and a packet priority indicated in the UEAssistanceInformation information being transmitted from the terminal to the base station and notify the terminal of the determined periodicity value. Here, the periodicity value should be changed for the mode 3 and mode 4 terminals under the same condition so as to be identified through scheduling assignment (SA) decoding, e.g., SCI format 1 decoding, in the case of using the shared resource pool. As an exemplary mode 3 terminal operation, the terminal configures an SPS periodicity value in the newly-defined resource reservation field, which is transmitted in the SCI format 1. Upon receipt of the SCI format 1 of another terminal, the mode 4 terminal may check the information included in the newly-defined resource reservation field for the resource use status of the shared resource pool to occupy resources necessary for V2X packet transmission.

When the mode 4 terminal performs sensing and preoccupies the idle resources of the mode 3 terminal, it may be possible to avoid collision between the mode 3 and mode 4 terminals based on the SCI format 1 information.

In an embodiment, the resources preoccupied by the mode 3 terminal should be reported to the base station, for which the mode 3 terminal receives an uplink grant at step (3) to report a mode 4 shared resource pool sensing result to the base station at step (4). According to an embodiment, the information on the resources occupied by the mode 3 terminal at step (2) may be transmitted to the base station in the SCI format 1, at step (4), along with a channel measurement or CBR measurement report. The preoccupied resource information report may include parameters such as a resource index for an initial reference time point, transmission resource periodicity (resource reservation interval information), a number of resources to be preoccupied, and subcarrier frequency information of radio resources.

The preoccupied resources reported to the base station may be used in two ways. First, the mode 3 terminal that has reported the sensing result is assigned the corresponding resources to perform sidelink communication and releases the resources at steps (5) and (6). Second, another mode 3 terminal that has not reported the sensing result is assigned the resources preoccupied by the mode 3 terminal that has reported the sensing result to perform sidelink communication and releases the resources at steps (7) and (8).

In the case where the preoccupied resources are no longer necessary, the base station releases the preoccupied resource at step (9).

For example, the mode 3 terminal may receive a message including a shared resource sensing instruction and a reporting instruction from the base station. The mode 3 terminal may sense the resources occupied by the mode 4 terminal in the shared resources based on the sensing instruction. The mode 3 terminal may report the resources occupied by the mode 4 terminal as a sensing result to the base station based on the reporting instruction.

The detailed operation of the mode 3 terminal in the above embodiment is described hereinafter with reference to the flowchart of FIG. 11.

Figure 11:
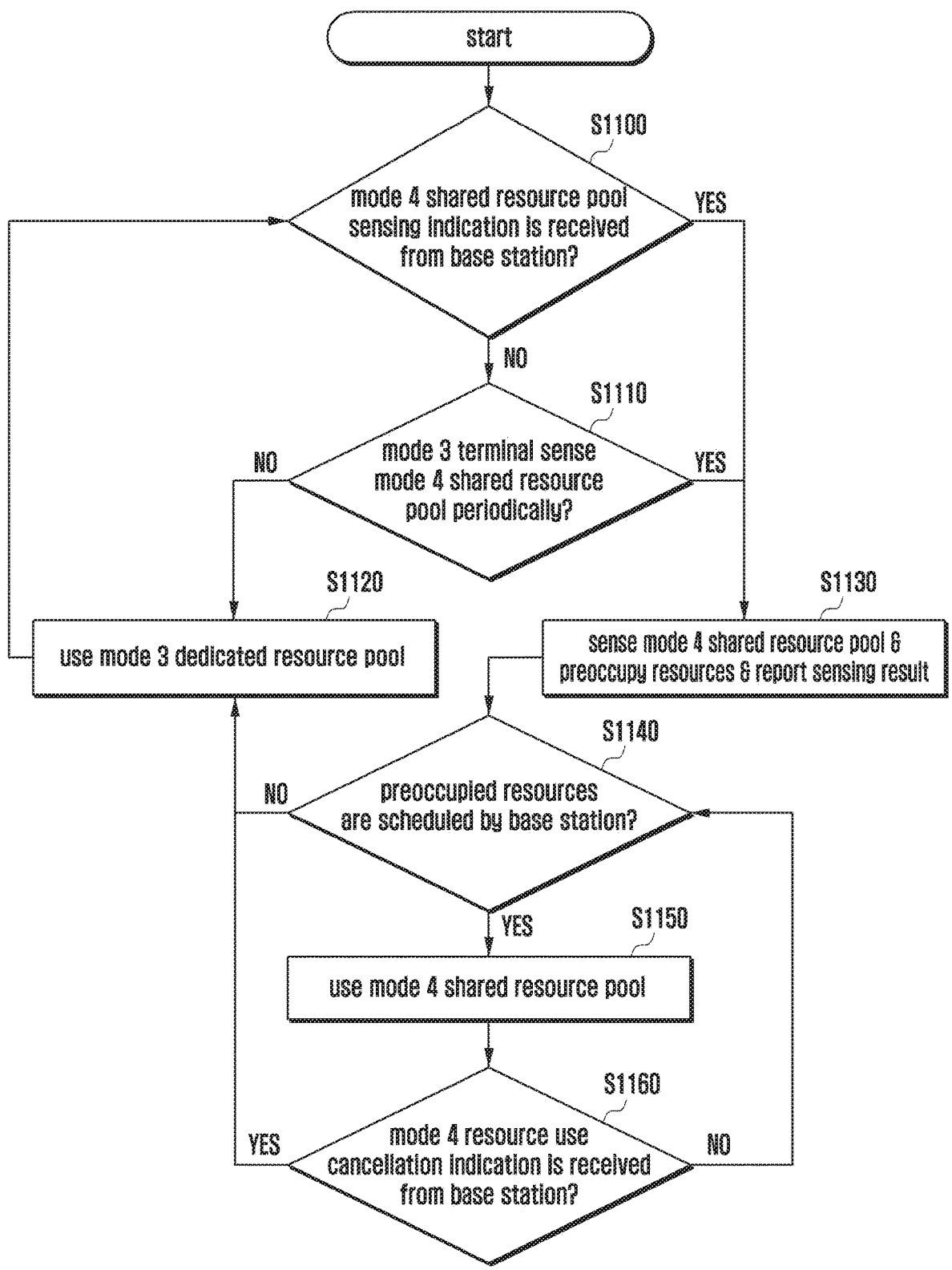
FIG. 11 is a flowchart illustrating an operation of the mode 3 terminal in the procedure of FIG. 10 when a mode 4 shared radio resource pool is established for V2X communication according to a disclosed embodiment.

FIG. 11 is a flowchart illustrating an operation of the mode 3 terminal in the procedure of FIG. 10 when a mode 4 shared radio resource pool is established for V2X communication according to a disclosed embodiment.

FIG. 11 shows the operation of the mode 3 terminal in the procedure of FIGS. 9A to 9C when a shared resource pool is established in a mode 4 radio resource pool for V2X communication according to a disclosed embodiment. According to an embodiment, the mode 3 terminal operates as follows (here, the mode 3 terminal senses the mode 4 shared resource pool and reports a sensing result).

At step S1100, the mode 3 terminal may determine whether a mode 4 shared resource pool sensing indication is received from the base station. If it is determined that the mode 4 shared resource pool sensing indication is received from the base station, the mode 3 terminal senses the mode 4 shared resource pool to preoccupy resources and reports a sensing result to the base station at step S1130. The mode 3 terminal may determine at step S1140 whether the preoccupied resources are scheduled by the base station and, if so, use the mode 4 shared resource pool at step S1150. Next, the mode 3 terminal may determine at step S1160 whether a mode 4 resource use cancellation indication is received from the base station and, if the mode 4 resource use cancellation indication is received, use the mode 3 dedicated resource pool at step S1120.

For example, if the mode 3 terminal directly receives the mode 4 shared resource pool sensing indication from the base station, it may sense the mode 4 shared resource pool and, if there are idle resources, preoccupy the resources. The mode 3 terminal reports a sensing result to the base station and, if the preoccupied resources are scheduled by the base station, performs sidelink communication using the resources in the mode 4 shared resource pool. Here, if the mode 4 shared resource pool use cancellation indication is received from the base station, the terminal may revert to mode 3 to use the mode 3 dedicated resource pool.

If it is determined at step S1100 that the mode 4 shared resource pool sensing indication is not received from the base station, the mode 3 terminal may determine at step S1110 whether it is configured to sense the mode 4 shared resource pool periodically and, if so, sense the mode 4 shared resource pool to preoccupy resources and report a sensing result to the base station at step S1130. The mode 3 terminal may determine at step S1140 whether the preoccupied resources are scheduled by the base station and, if so, use the mode 4 shared resource pool at step S1150. Next, the mode 3 terminal may determine at step S1160 whether a mode 4 resource use cancellation indication is received from the base station and, if the mode 4 resource use cancellation indication is received, use the mode 3 dedicated resource pool at step S1120.

As another example, even though the mode 4 shared resource pool sensing indication is not received from the base station, if the mode 3 terminal is configured to sense the mode 4 shared resource pool periodically, it preoccupies the resources sensed as idle in the sensed resources. The mode 3 terminal reports a sensing result to the base station and, if the preoccupied resources are scheduled by the base station, performs sidelink communication using the resources in the mode 4 shared resource pool. Here, if the mode 4 shared resource pool use cancellation indication is received from the base station, the terminal may revert to mode 3 to use the mode 3 dedicated resource pool.

If it is determined at step S1100 that no mode 4 shared resource pool sensing indication is received from the base station and if it is not configured to sense the mode 4 shared resource pool periodically, the mode 3 terminal may use the mode 3 dedicated resource pool at step S1120.

As another example, if no mode 4 shared resource pool sensing indication is received from the base station and if the mode 3 terminal is not configured to sense the mode 4 shared resource pool periodically, the mode 3 terminal may perform sidelink communication using resources allocated in the mode 3 dedicated resource pool.

As another example, even though the mode 3 terminal senses the mode 4 shared resource pool to preoccupy resources, if the resources are not scheduled by the base station and are in use by another mode 3 terminal, the mode 3 terminal is allocated resources in the mode 3 dedicated resource pool for sidelink communication.

As another example, after sensing the mode 4 shared resource pool to preoccupy resources, the mode 3 terminal may perform a one-time transmission using the preoccupied resources without being separately scheduled by the base station as the mode 4 terminal does.

In the case where V2X resources allocated to the mode 3 terminal in an SPS manner are released, the mode 3 terminal may transmit to the base station a signal in order to check for use of the V2X resources allocated in the SPS manner and a signal in order to check for release of the V2X resources allocated in the SPS manner A detailed description given in the following embodiment is applicable to the case of allocating V2X resources in a shared resource pool or a non-shared resource pool in a SPS manner.

The base station may transmit SPS-based V2X resource configuration information to the mode 3 terminal. The SPS-based V2X resource configuration information (V2X SPS configuration) being transmitted from the base station to the mode 3 terminal may include an SPS resource allocation configuration (resource periodicity, information on services using the resource, duplication configuration information, etc.). The SPS-based V2X resource configuration information may include information instructing the terminal to transmit a response signal (V2X SPS confirmation) upon receipt of a signal indicative of canceling the use of the SPS-based V2X resources. The SPS-based V2X resource configuration information may include information instructing the terminal to continuously transmit a response signal (V2X SPS confirmation) while using the SPS-based V2X resources.

According to another embodiment, the terminal that uses the SPS-based resources may transmit a response signal (V2X SPS confirmation) in response to an SPS resource release signal (V2X SPS release) from the base station.

The V2X SPS configuration signal may be used for indicating that the terminal is still using the SPS resources (or needs to use the SPS resources) and the base station does not need to release the SPS resources.

The V2X SPS confirmation signal may also be used notify the base station of the existence of an uplink packet or sidelink packet to be transmitted by the terminal with the SPS configuration for V2X communication and prevent the base station from releasing the SPS configuration. If the V2X SPS configuration signal being transmitted by the terminal is received in accordance with the configuration of the base station, the base station may not release the SPS resources corresponding to the SPS configuration because the SPS configuration is in use by the terminal. If the V2X SPS configuration signal being transmitted by the terminal is not received in accordance with the configuration of the base station, the base station may assume that the terminal does not use the SPS configuration and release the SPS resources corresponding to the SPS configuration. Because it is difficult for the base station to check for a sidelink transmission resource use status (the base station has the information for use in checking for an uplink resource use status because the uplink resources are used for transmitting packets to the base station), the V2X SPS confirmation may be helpful for the base station in managing sidelink resource utilization.

Hereinafter, a description is made of the operation for a terminal to trigger V2X SPS configuration transmission according to an embodiment.

In an embodiment, the terminal is preconfigured to trigger V2X SPS confirmation transmission periodically rather than upon receipt of the V2X SPS release.

The base station may configure both the V2X SPS configuration and V2X SPS confirmation.

For example, an SPS-ConfigSL information element may be expressed as shown in Table 1.

TABLE 1

```
SPS-ConfigSL-r14 ::= SEQUENCE {
    sps-ConfigIndex-r14        SPS-ConfigIndex-r14,
    semiPersistSchedIntervalSL-r14 ENUMERATED {
        sf20, sf50, sf100, sf200, sf300, sf400,
        sf500, sf600, sf700, sf800, sf900, sf1000,
        spare4, spare3, spare2, spare1}
    semiPersistSchedConfirmationSL-r15 ENUMERATED {
        interval_1, interval_2, interval_3, ...}
}
```

The semiPersistSchedConfirmationSL-r15 may include multiple V2X SPS confirmation transmission periodicities, which are scalable according to an SPS interval. It is not necessary for the SPS confirmation transmission periodicity to be set to a value less than the SPS interval to be configured.

The configured SPS confirmation transmission periodicity may be always applied when the SPS interval is less than X. The base station may notify the terminal of X in configuring the V2X SPS confirmation. In the case where the base station does not notify the terminal of X, the information on X may be preconfigured.

The configured SPS configuration transmission periodicity may be always applied when the skipSidelinkTxSPS is configured in the V2X SPS configuration.

According to another embodiment, it may be possible to consider that the V2X SPS configuration transmission is triggered by the V2X SPS release and skipSidelinkTxSPS as shown in Table 2.

TABLE 2 if PDCCH contents indicate V2X SPS release:
    if the MAC entity is configured with skipSidelinkTxSPS:
        trigger an V2X SPS confirmation;
        ...
    else:
        if the MAC entity is configured with skipSidelinkTxSPS:
            trigger an V2X SPS confirmation;
            ...

If the skipSidelinkTxSPS is configured in the V2X SPS configuration and the V2X SPS release indication is received from the base station, the terminal may or may not transmit the V2X SPS confirmation. If the received V2X SPS release indicates that there is no packet to transmit, it is not necessary for the terminal to transmit the V2X SPS confirmation. If the received V2X SPS release indicates that there is a packet to transmit, the terminal may transmit the V2X SPS confirmation.

According to another embodiment, it may be possible to transmit a V2X SPS monitoring signal in separation from the V2X SPS release. Upon receipt of the V2X SPS monitoring signal from the base station, the terminal may transmit the V2X SPS confirmation. Here, if the terminal has a packet to transmit using the SPS resources, it may transmit the V2X SPS confirmation; if the terminal has no packet to transmit using the SPS resources, it is not necessary for the terminal to transmit the V2X SPS confirmation.

If it is necessary to release the V2X SPS resources, the base station may transmit a V2X SPS release signal, and the terminal stops using the V2X SPS resources without transmitting a response. In order for the base station to check for the use of the V2X SPS resources, the base station transmits the V2X SPS monitoring signal, and the terminal may transmit the V2X SPS configuration depending on whether there is a packet to be transmitted.

Hereinafter, descriptions are made of the operations of the base station managing the V2X SPS confirmation according to various embodiments.

If no V2X SPS configuration is received during a V2X SPS configuration period of the terminal, the base station may release the V2X SPS resources. For example, if the V2X SPS confirmation is not received consecutively at n transmission occasions of the terminal, the base station may release the V2X SPS resources.

If the base station receives no V2X SPS confirmation from the base station after transmitting the V2X SPS release, it may release the V2X SPS resources. For example, if the base station transmits V2X SPS release m times consecutively and receives no V2X SPS confirmation consecutively at n occasions, it may release the V2X SPS resources.

If the base station transmits a V2X SPS monitoring signal and does not receive the V2X SPS confirmation from the terminal in reply, it may perform a V2X SPS resource release procedure. If the base station receives the V2X SPS confirmation from the terminal in reply to the V2X SPS monitoring, it may maintain the V2X SPS resources for the corresponding terminal.

Figure 12A:
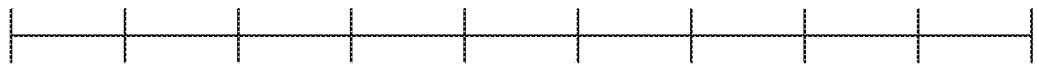
FIG. 12A is a diagram illustrating an exemplary V2X SPS configuration message format according to a disclosed embodiment.

FIG. 12A shows a V2X SPS confirmation message format according to a disclosed embodiment.

A V2X SPS confirmation MAC CE may include a subheader with an LCID indicative of the V2X SPS confirmation. An LCID for V2X SPS confirmation may be separately defined to be similar to the Rel-14 SPS confirmation as shown in Table 3.

TABLE 3

| LCID = 10101 | SPS confirmation |
|---|---|

(Rel-14 SPS Confirmation LCID is Set to 10101)

It may be possible to define separately an LCID for confirmation on an uplink V2X SPS configuration and an LCID for confirmation on a sidelink V2X SPS configuration.

The V2X SPS confirmation MAC CE may include an indication field indicating confirmation on the V2X SPS configuration in the subheader. The confirmation indication field may be helpful for clearly identifying the status of each SPS configuration. That is, because the base station may not distinguish between SPS configurations with different purposes without the confirmation indication field indicative of the purpose of the SPS configuration, the confirmation indication on the SPS configuration is helpful for resource management of the base station such as release of SPS resources not in use. The confirmation indication may prevent the terminal from unnecessarily releasing the SPS resources in use and being reallocated SPS resources.

The number of SPS configurations may determine a number of confirmation indication fields. The number of SPS configurations may correspond to the number of Uu V2X SPS configurations for allocating uplink resources in an SPS manner or the number of PC5 V2X SPS configurations for allocating sidelink resources in an SPS manner, and it is obvious that different SPS confirmation MAC CEs can be defined for uplink and sidelink.

Figure 12B:
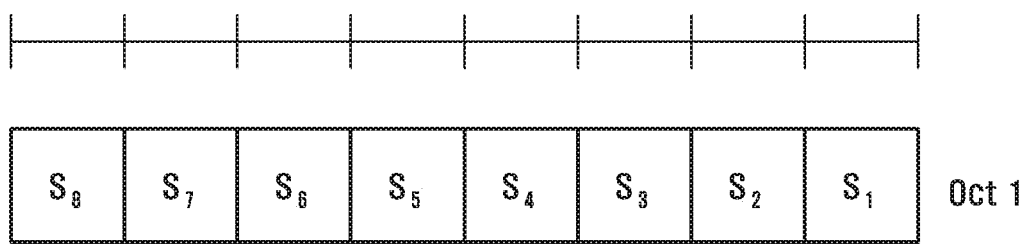
FIG. 12B is a diagram illustrating confirmation indication information corresponding to an SPS configuration according to a disclosed embodiment.

According to an embodiment, assuming 8 SPS configurations, the confirmation indication information corresponding to individual SPS configurations is arranged as shown in FIG. 12B. In FIG. 12B, $S_y$ may denote an SPS configuration index. For example, S1 may be set to 1 for indicating confirmation on the SPS configuration index 1. According to another embodiment, assuming 8 SPS configurations, each SPS configuration may be identified with a 3-bit index (000~111). The confirmation indication information may vary according to the number of supportable SPS configurations and may be expressed with log 2(N) bits for N SPS configurations. In the case where the confirmation indication information is expressed with the SPS configuration index value, it may be necessary to notify the base station that the SPS confirmation corresponds to the SPS configuration identified by the index value.

If a number of carriers in use for V2X is greater than 1, it may be necessary to use per-carrier SPS configurations. In this case, the SPS confirmation MAC CE may be configured to carry SPS confirmations corresponding to per-carrier SPS configurations.

Figure 12C:
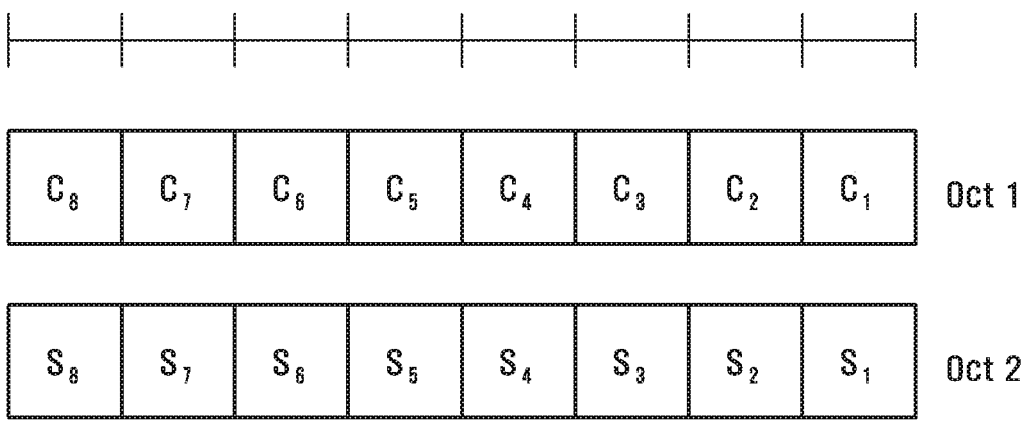
FIG. 12C is a diagram illustrating configuration indication information corresponding to an SPS configuration according to a disclosed embodiment.

According to an embodiment, assuming that 8 carriers are in use for V2X communication with 8 SPS configurations, the confirmation indication information corresponding to each SPS configuration may be expressed as shown in FIG. 12C. In the drawing, $C_x$ may denote a carrier index, and $S_y$ may denote an SPS configuration index. For example, the confirmation on an SPS configuration indicated by index 1 in a carrier indicated by index 2 may be indicated by setting $C_2$ to 1 and $S_1$ to 1.

According to another embodiment, assuming 8 SPS configurations, each SPS configuration can be identified with 3 bits (000~111). The confirmation indication information may vary according to the number of supportable SPS configurations and may be expressed with log 2(N) bits for N SPS configurations. In the case where the confirmation indication information is expressed with the SPS configuration index value, it may be necessary to notify the base station that the SPS confirmation corresponds to the SPS configuration identified by the index value.

According to another embodiment, assuming that 8 carriers are in use for V2X communication with 8 SPS configurations, the SPS confirmation indication may be made with a 3-bit carrier index (000~111) instead of a V2X SPS configuration bitmap. The confirmation indication information may vary according to the number of supportable V2X carriers and may be expressed with log 2(N) bits for N V2X carriers. In the case where the confirmation indication is expressed with the V2X carrier index value, it may be necessary to notify the base station that the SPS confirmation corresponds to the V2X carrier identified by the index value.

Meanwhile, a combination of the above-described subheader and confirmation indication options may be used for each of uplink V2X SPS confirmation and sidelink V2X SPS confirmation.

The V2X SPS confirmation may be used to notify the base station of the existence of an uplink or sidelink packet to be transmitted by the terminal according to the SPS configuration corresponding to the V2X SPS configuration and confirmation indication field and prevent the base station from releasing the SPS configuration.

In the case of using the confirmation indication field, the confirmation indication field may be set to 0 for the same effect as no transmission of the V2X SPS confirmation and 1 for the same effect as transmission of the V2X SPS confirmation. That is, the confirmation indication field may be set to 0 for the purpose of indicating that no packet exists to be transmitted with the V2X SPS resources and 1 for the purpose of indicating a packet to be transmitted with the V2X SPS resources.

Figure 13:
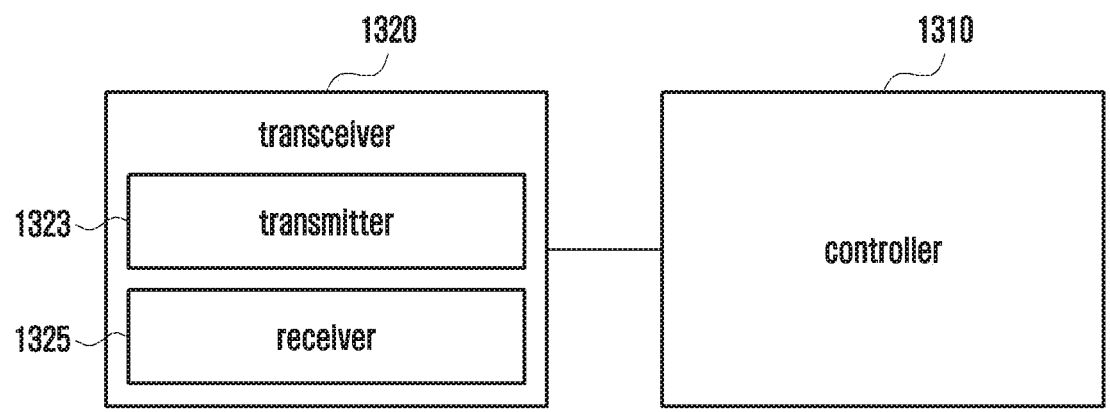
FIG. 13 is a block diagram illustrating a configuration of a terminal according to a disclosed embodiment.

FIG. 13 is a block diagram illustrating a configuration of a terminal according to a disclosed embodiment.

According to a disclosed embodiment, the terminal may include a transceiver 1320 and a controller 1310 for controlling overall operations of the terminal. The transceiver 1320 may include a transmitter 1323 and a receiver 1325.

The transceiver 1320 may communicate signals with network entities.

The controller 1310 may control the terminal to perform one of the operations described in the above embodiments. Although they are depicted as separated modules, the controller 1310 and the transceiver 1320 may be implemented as a component in the form of a single chip. The controller 1310 and the transceiver 1320 may be electrically connected to each other. For example, the controller 1310 may be a circuit, an application-specific circuit, or at least one processor. The operations of the terminal may be implemented by executing corresponding program codes stored in a memory device implemented as a component of the terminal.

For example, the terminal depicted in FIG. 13 may be one of a mode 3 terminal or a mode 4 terminal.

In the case where the terminal depicted in FIG. 13 is a mode 3 terminal, the controller 1310 may control the transceiver 1320 to receive a message including information on the shared resources for vehicle-to-everything (V2X) communication of mode 3 and mode 4 terminals from a base station. The controller 1310 may configure a resource reservation field based on the shared resource information and an SPS periodicity configured to the mode 3 terminal and control the transceiver 1320 to transmit a control message including the configured resource reservation field.

The controller 1310 may also control to perform transmission in sidelink control information (SCI) format 1.

The controller 1310 may also control the transceiver 1320 to receive a message including a shared resource sensing instruction and a reporting instruction from the base station. The controller 1310 may control to sense the resources occupied by the mode 4 terminal in the shared resources based on the sensing instruction and report a sensing result to the base station based on the reporting instruction.

In the case where the terminal depicted in FIG. 13 is a mode 4 terminal, the controller 1310 may control the transceiver 1320 to receive a message including information on the shared resources for V2X communication of mode 3 and mode 4 terminals from the base station and a control message including a resource reservation field configured based on the shared resource information received from the mode 3 terminal and an SPS periodicity configured to the mode 3 terminal.

The controller 1310 may receive the control message transmitted in the SCI format 1.

The controller 1310 may check for the resources occupied by the mode 3 terminal in the shared resources based on the received control message and control the transceiver 1320 to perform V2X communication based on the resources occupied by the mode 3 terminal.

Figure 14:
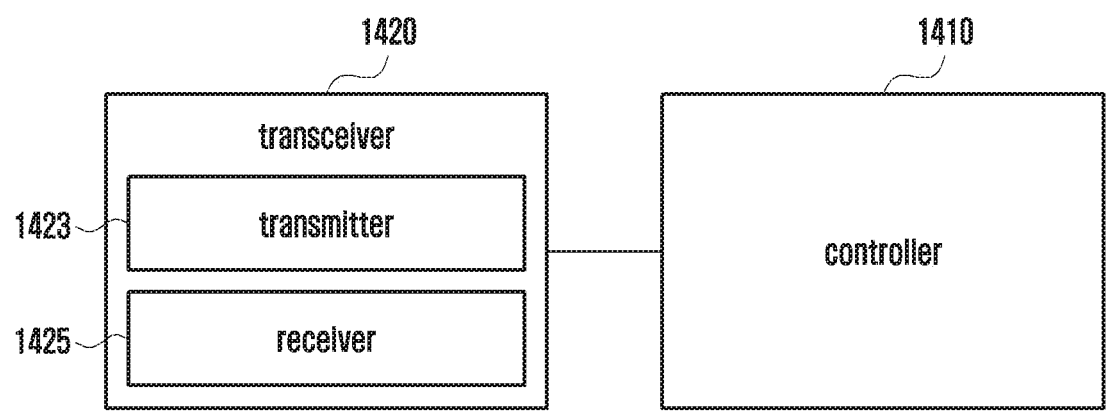
FIG. 14 is a block diagram illustrating a configuration of a base station according to a disclosed embodiment.

FIG. 14 is a block diagram illustrating a configuration of a base station according to a disclosed embodiment.

According to a disclosed embodiment, the base station may include a transceiver 1420 and a controller 1410 for controlling overall operations of the base station. The transceiver 1420 may include a transmitter 1423 and a receiver 1425.

The transceiver 1320 may communicate signals with other network entities.

The controller 1410 may control the base station to perform one of the operations described in the above embodiments. Although they are depicted as separated modules, the controller 1410 and the transceiver 1420 may be implemented as a component in the form of a single chip. The controller 1410 and the transceiver 1420 may be electrically connected to each other. For example, the controller 1410 may be a circuit, an application-specific circuit, or at least one processor. The operations of the base station may be implemented by executing corresponding program codes stored in a memory device implemented as a component of the base station.

The embodiments disclosed in the specification and drawings are proposed to help explain and understand the present invention rather than to limit the scope of the present invention. It is obvious to those skilled in the art that various modifications and changes can be made thereto without departing from the broader spirit and scope of the disclosure.

Although the embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure.

The invention claimed is:

1. A method of a second mode terminal in a wireless communication system, the method comprising:
 receiving a message including information on shared resources for vehicle-to-everything (V2X) communication of a first mode terminal and a second mode terminal from a base station; and
 receiving a control message including a resource reservation field configured based on the information on the shared resources and a semi-persistent scheduling (SPS) periodicity configured to the first mode terminal from the first mode terminal.

2. The method of claim 1, wherein receiving the control message comprises receiving the control message transmitted by using sidelink control information (SCI) format 1.

3. The method of claim 1,
 wherein the first mode terminal is a sidelink transmission mode 3 terminal, and
 wherein the second mode terminal is a sidelink transmission mode 4 terminal.

4. The method of claim 1, further comprising:
 identifying resources occupied by the first mode terminal in the shared resources based on the received control message; and
 performing V2X communication based on the resources identified as being occupied by the first mode terminal.

5. A second mode terminal in a wireless communication system, the second mode terminal comprising:
 a transceiver; and
 a controller configured to:
  control the transceiver to receive a message including information on shared resources for vehicle-to-everything (V2X) communication of a first mode terminal and the second mode terminal from a base station, and
  receive a control message including a resource reservation field configured based on the information on the shared resources and a semi-persistent scheduling (SPS) periodicity configured to the first mode terminal from the first mode terminal.

6. The second mode terminal of claim 5, wherein the controller is configured to control the transceiver to receive the control message transmitted by using sidelink control information (SCI) format 1.

7. The second mode terminal of claim 5, wherein the controller is configured to:
 control to identify resources occupied by the first mode terminal in the shared resources based on the received control message, and
 control the transceiver to perform V2X communication based on the resources identified as being occupied by the first mode terminal,
 wherein the first mode terminal being a sidelink transmission mode 3 terminal, and
 wherein the second mode terminal being a sidelink transmission mode 4 terminal.

* * * * *